US010614133B2

(12) United States Patent
Pollock

(10) Patent No.: US 10,614,133 B2
(45) Date of Patent: Apr. 7, 2020

(54) DISTRIBUTED WEB BROWSER SOFTWARE ARCHITECTURE

(71) Applicant: Timothy J Pollock, Ballwin, MO (US)

(72) Inventor: Timothy J Pollock, Ballwin, MO (US)

(*) Notice: Subject to any disclaimer, the term of this patent is extended or adjusted under 35 U.S.C. 154(b) by 182 days.

(21) Appl. No.: 15/892,362

(22) Filed: Feb. 8, 2018

(65) Prior Publication Data
US 2019/0243920 A1 Aug. 8, 2019

(51) Int. Cl.
G06F 16/95 (2019.01)
H04L 29/06 (2006.01)
H04L 29/08 (2006.01)
G06F 21/00 (2013.01)
G06F 9/00 (2006.01)

(52) U.S. Cl.
CPC ............ G06F 16/95 (2019.01); G06F 9/00 (2013.01); G06F 21/00 (2013.01); H04L 63/00 (2013.01); H04L 67/02 (2013.01); H04L 67/10 (2013.01); H04L 67/40 (2013.01); H04L 67/42 (2013.01)

(58) Field of Classification Search
None
See application file for complete search history.

(56) References Cited

U.S. PATENT DOCUMENTS

| | | | | |
|---|---|---|---|---|
| 6,170,019 B1* | 1/2001 | Dresel | ............... | G06F 11/0757 719/330 |
| 2004/0133848 A1* | 7/2004 | Hunt | ............... | G06F 16/9577 715/273 |
| 2005/0021826 A1* | 1/2005 | Kumar | ............... | H04L 67/14 709/232 |
| 2009/0077171 A1* | 3/2009 | Kasha | ............... | G06F 16/957 709/203 |
| 2009/0191917 A1* | 7/2009 | Zappulla | ............... | H04L 69/16 455/558 |
| 2010/0256979 A1* | 10/2010 | Freund | ............... | G10L 15/26 704/270 |
| 2011/0039514 A1* | 2/2011 | Patnaik | ............... | H04M 1/72541 455/404.2 |
| 2011/0191696 A1* | 8/2011 | Jain | ............... | G06F 15/16 715/758 |
| 2011/0276695 A1* | 11/2011 | Maldaner | ............... | G06F 9/5083 709/226 |
| 2012/0050777 A1* | 3/2012 | Matsumoto | ............... | H04N 1/00896 358/1.13 |
| 2015/0143544 A1* | 5/2015 | Lu | ............... | H04L 63/10 726/29 |
| 2015/0188611 A1* | 7/2015 | Tsuzuki | ............... | H04B 5/02 455/41.1 |

(Continued)

Primary Examiner — Kenny S Lin

(57) ABSTRACT

Methods for a distributed web browser software architecture are described herein. In an embodiment, a client web browser software application provides input functionality and displays web pages, while a server web browser software application acquires the resources necessary for rendering those web pages. A communication connection between the client and server browser applications joins them into a distributed web browser. In this way a server browser running on a personal device, such as a smartphone, can be used in conjunction with a client browser running on a separate hardware device having efficient input capabilities (keyboard, mouse, etc.) and a large display so that the user can work with complex web applications in an efficient manner.

4 Claims, 21 Drawing Sheets

(56) References Cited

U.S. PATENT DOCUMENTS

| | | | |
|---|---|---|---|
| 2016/0062958 A1* | 3/2016 | Shirakawa | G06F 40/123 |
| | | | 715/234 |
| 2017/0277519 A1* | 9/2017 | Lee | G06F 8/34 |
| 2018/0098363 A1* | 4/2018 | Boling | H04W 84/18 |
| 2018/0367494 A1* | 12/2018 | Skeene | H04L 51/12 |
| 2019/0068580 A1* | 2/2019 | Amid | H04L 67/38 |

\* cited by examiner

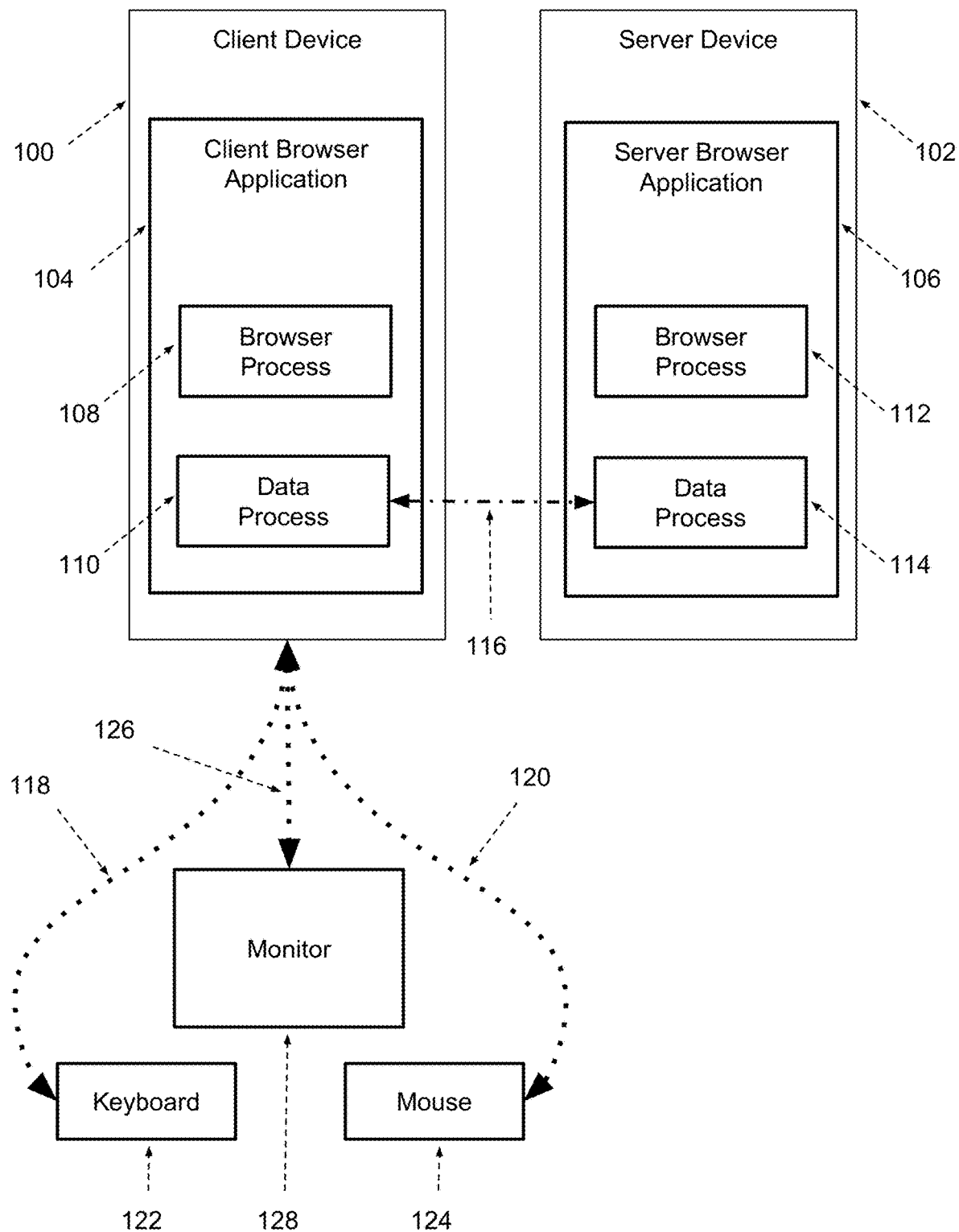

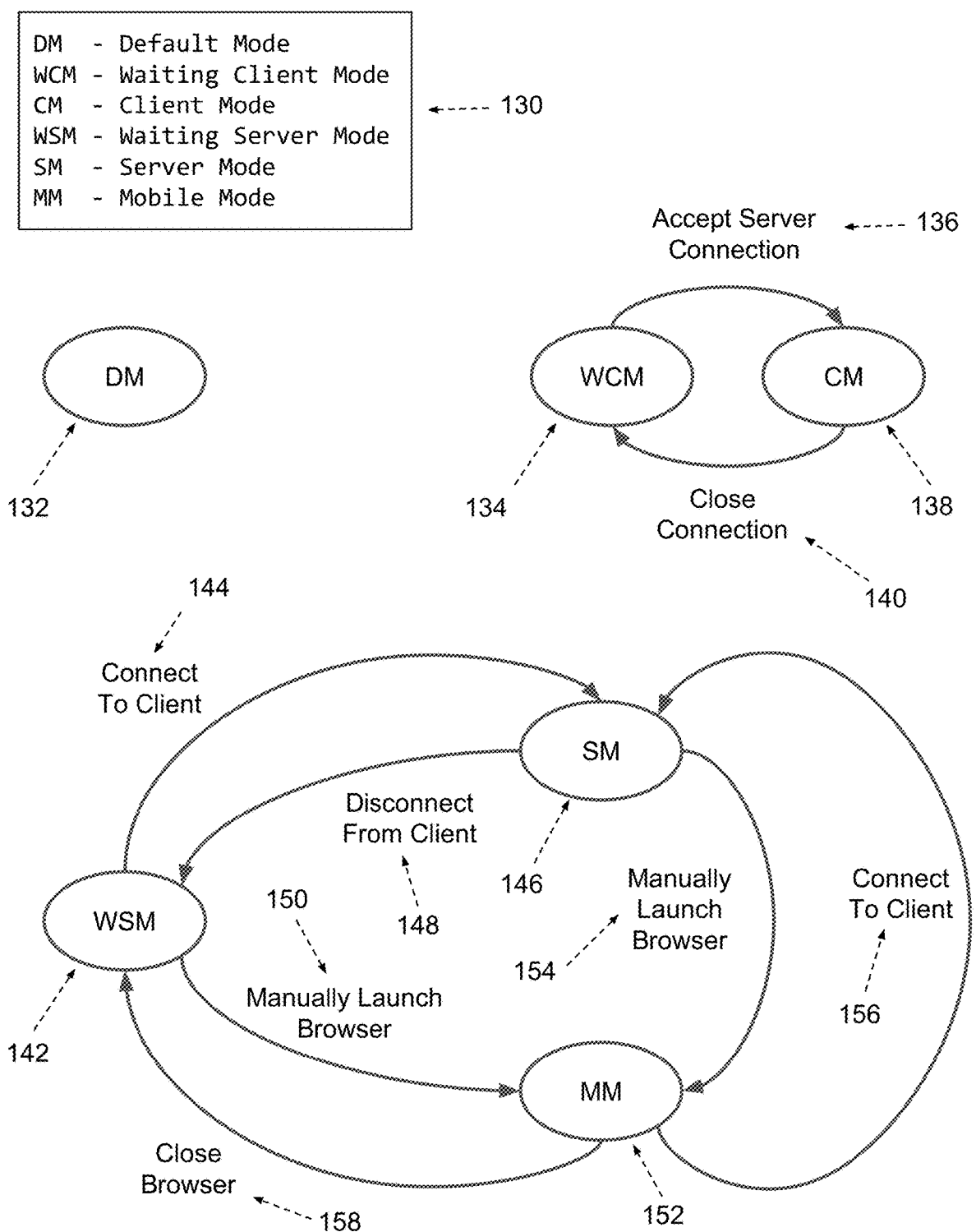
FIG. 2 Browser Modes of Operation

FIG. 3    Waiting-Client Mode - Broadcast To Servers
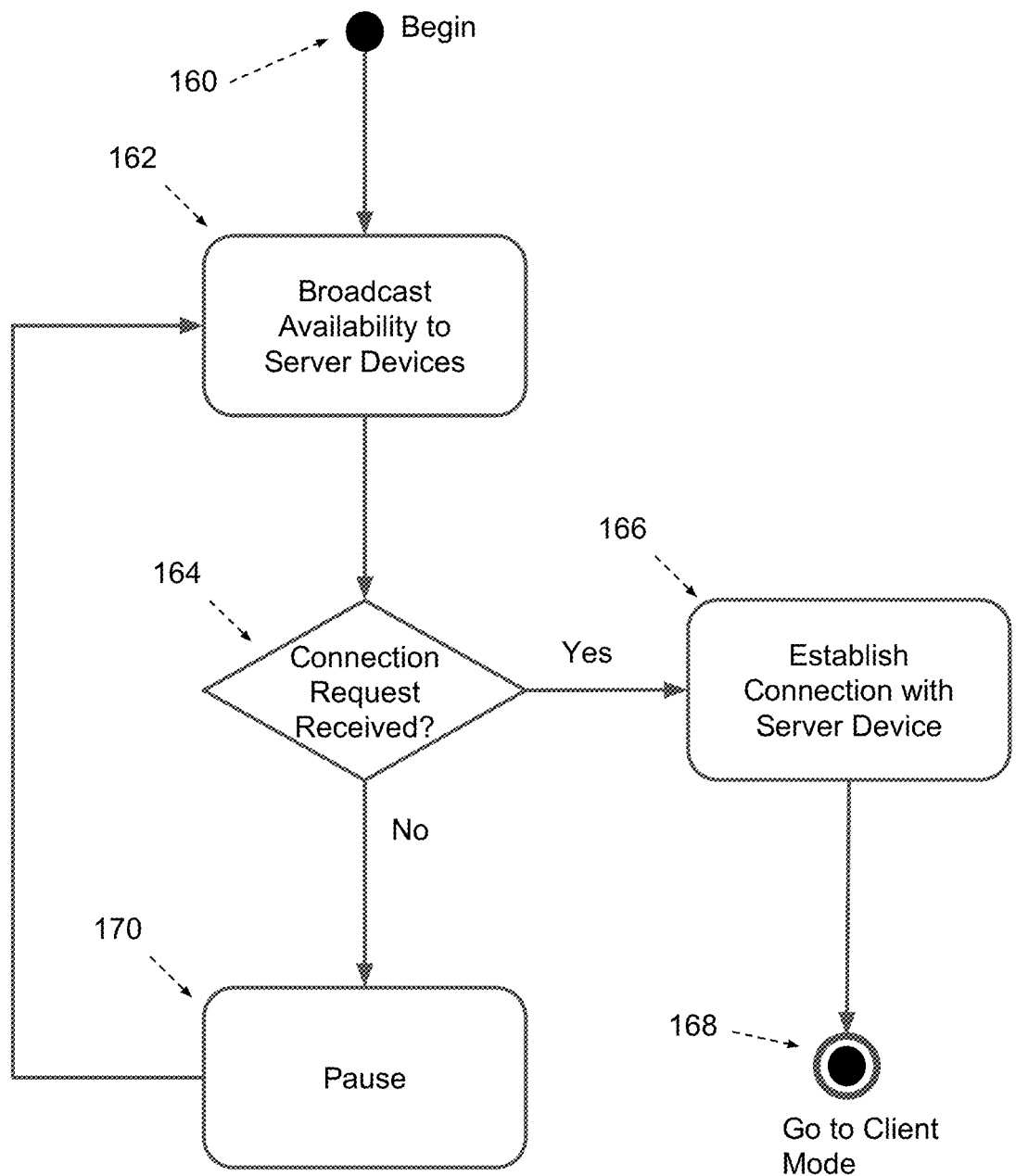

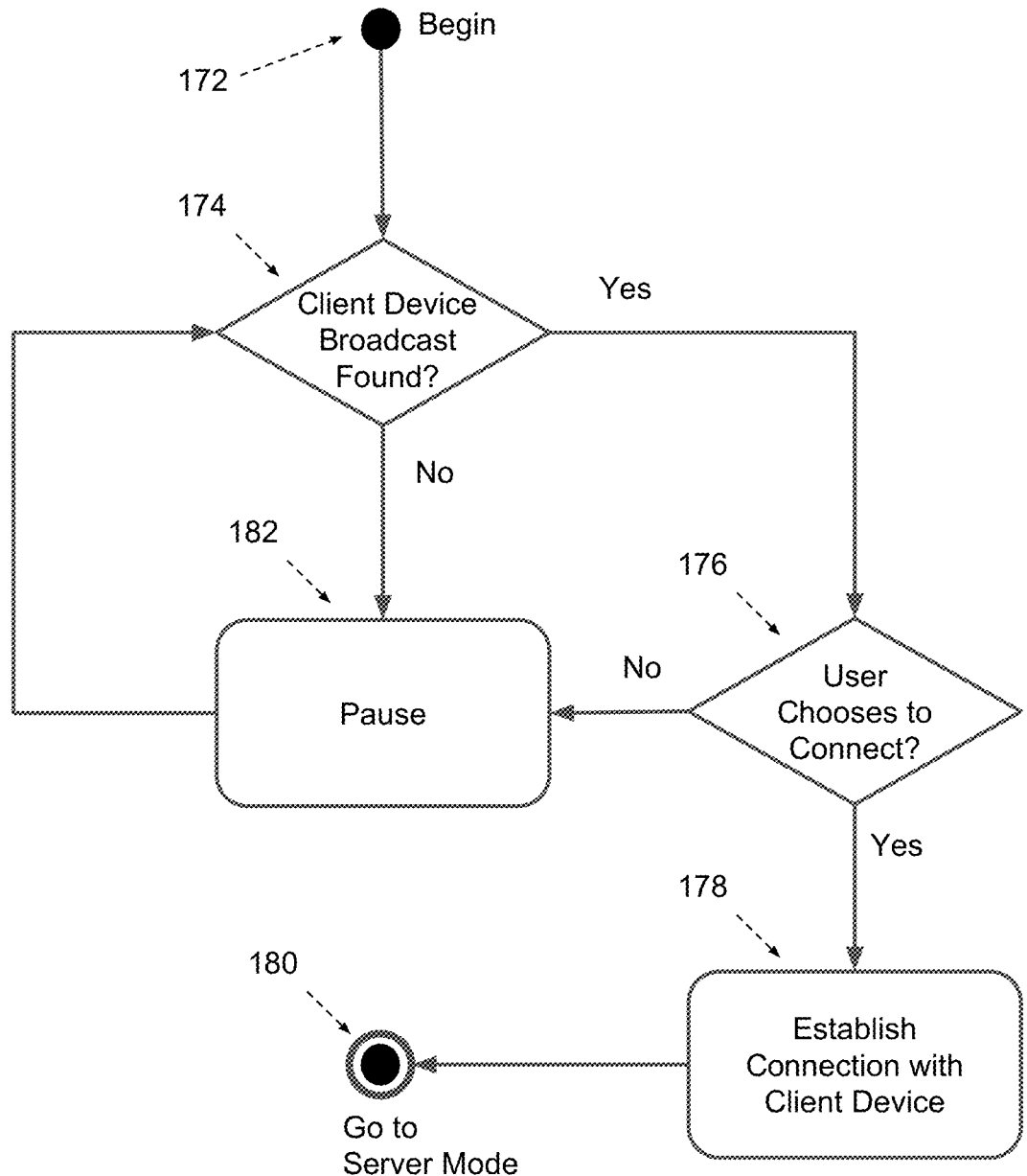
FIG. 4    Waiting-Server Mode - Client Discovery

FIG. 5  Client Mode - Health Check Thread
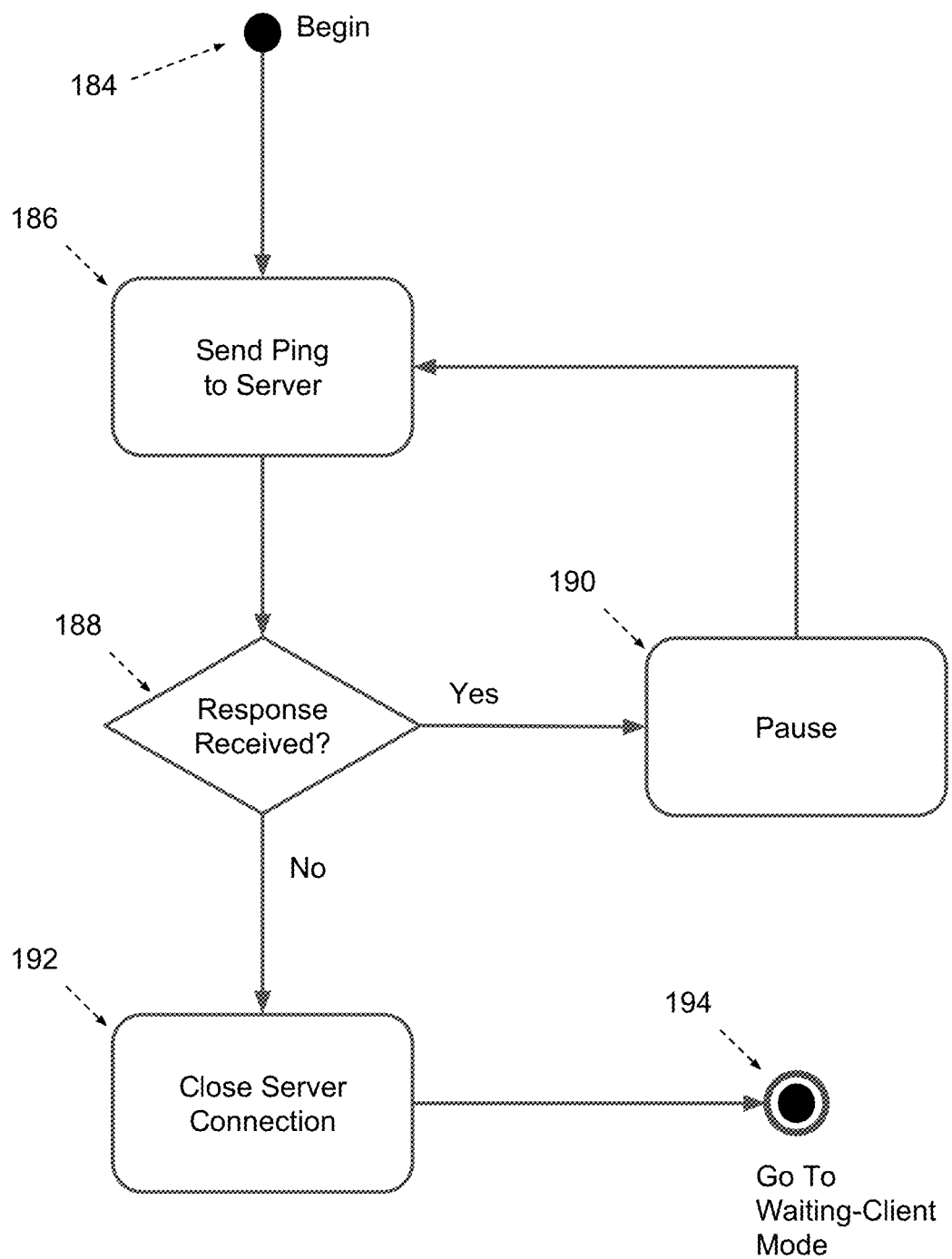

FIG. 6      Server Mode - Health Check Thread
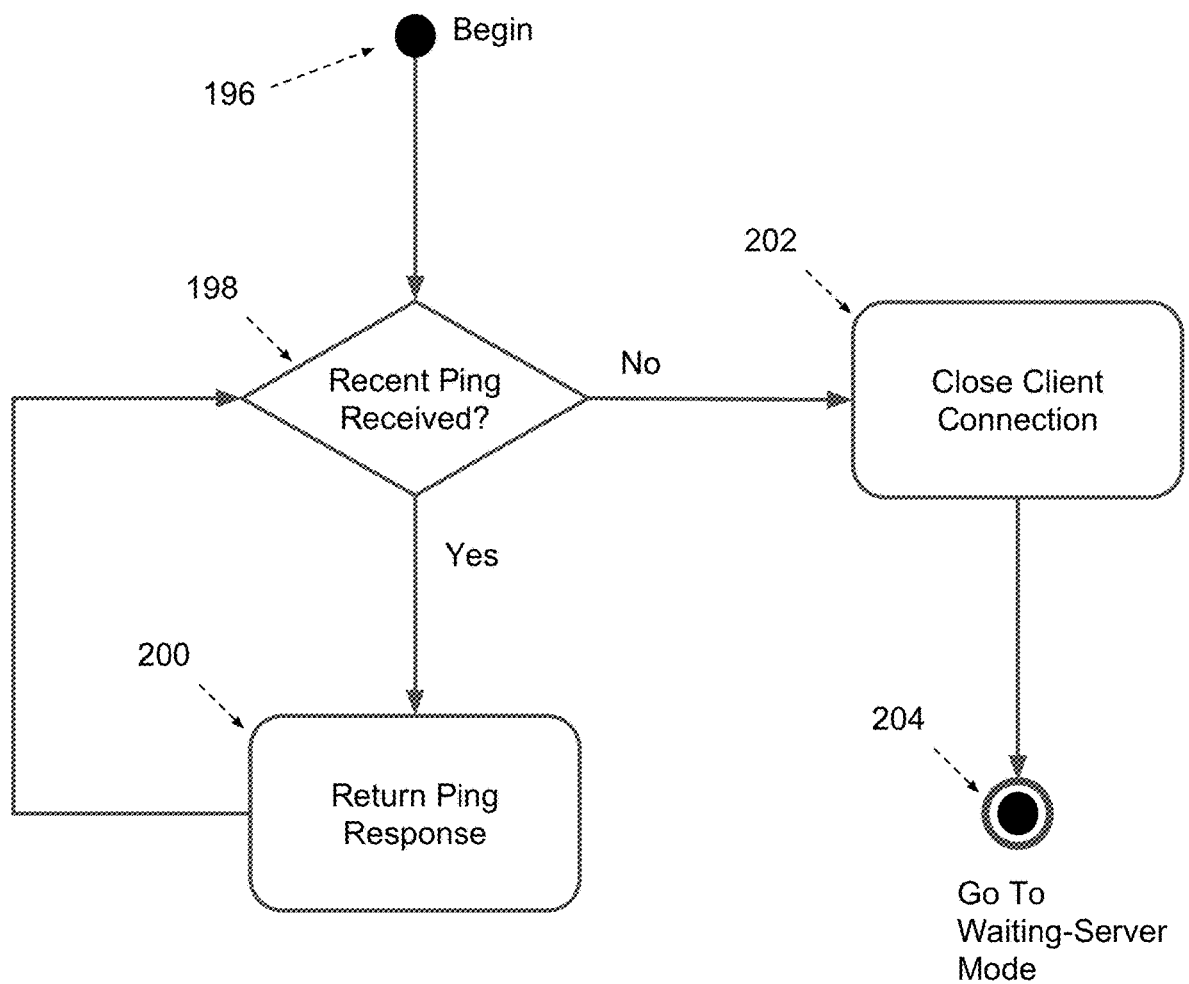

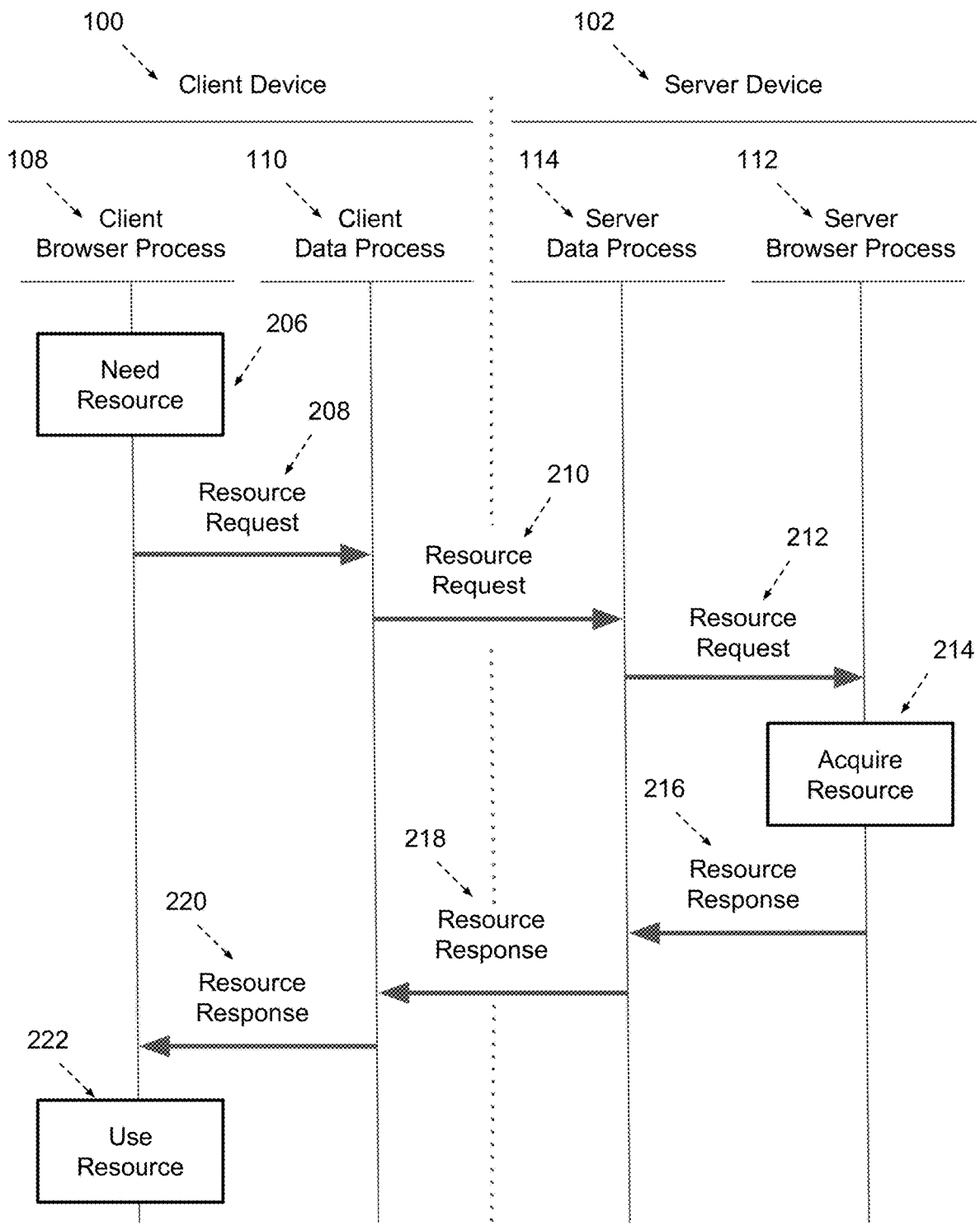
FIG. 7   Client/Server Resource Request/Response

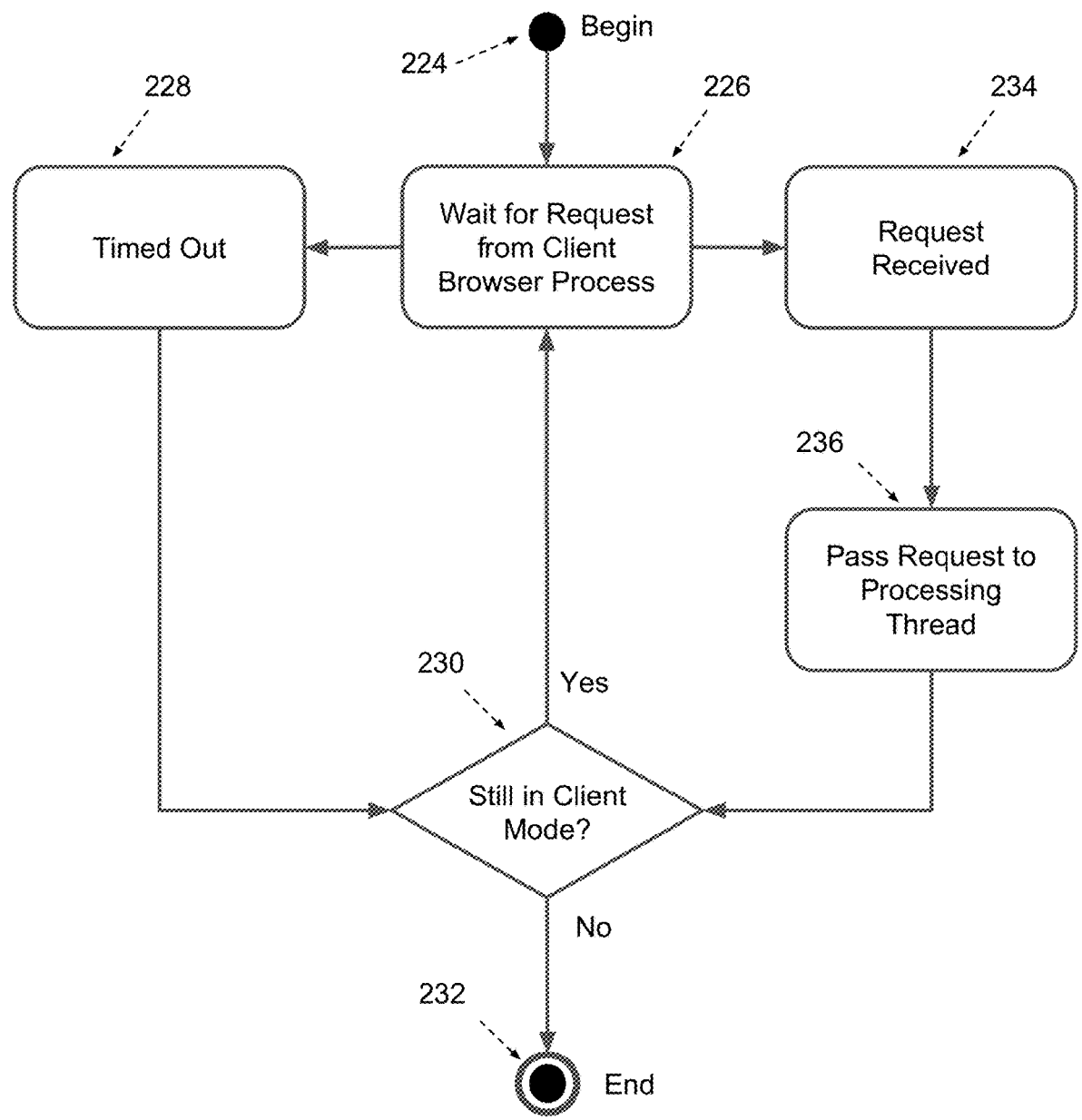
FIG. 8　　Client Mode - Watch for Requests

FIG. 9     Client Mode - Request Processing Thread
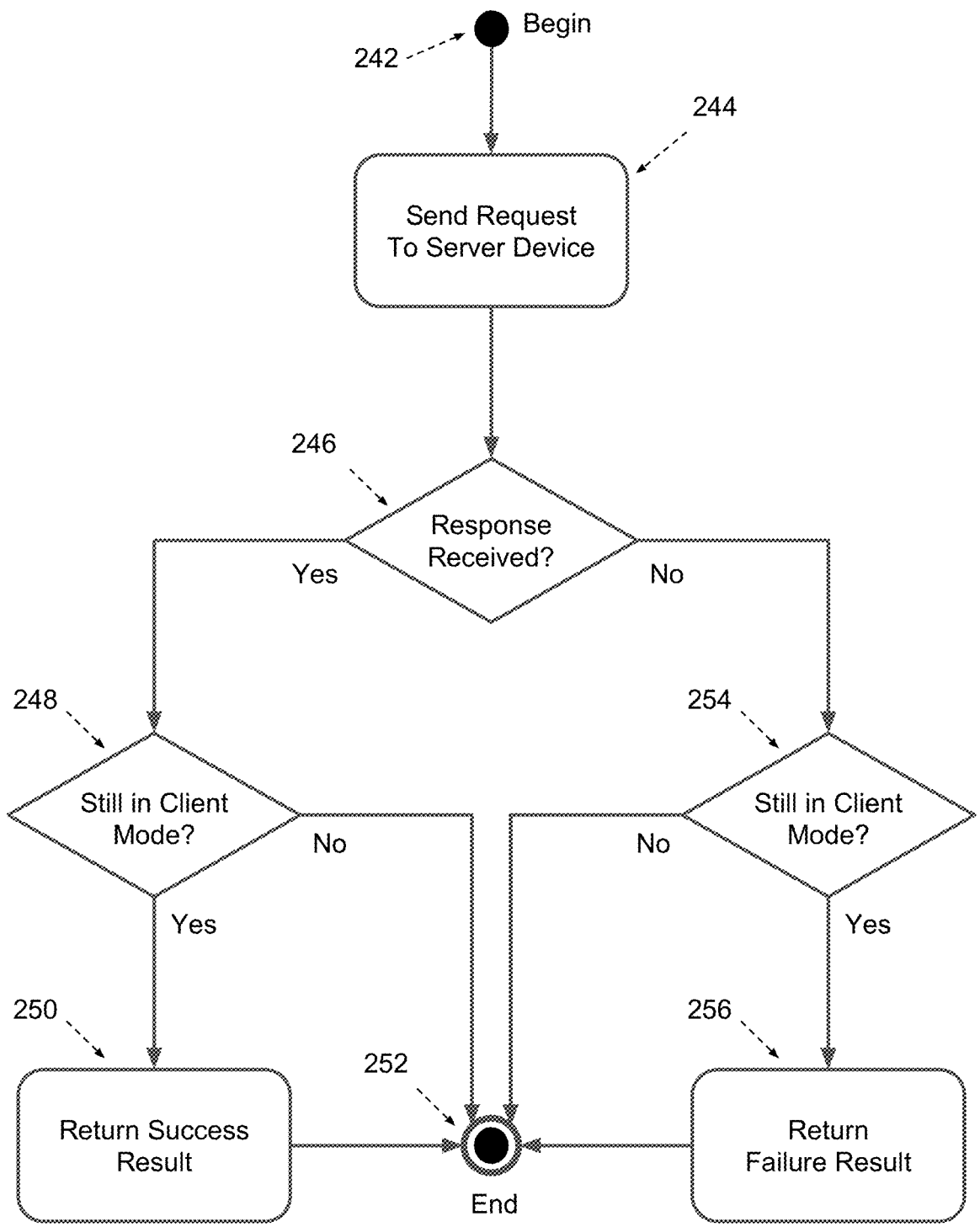

FIG. 10      Server Mode – Watch for Requests
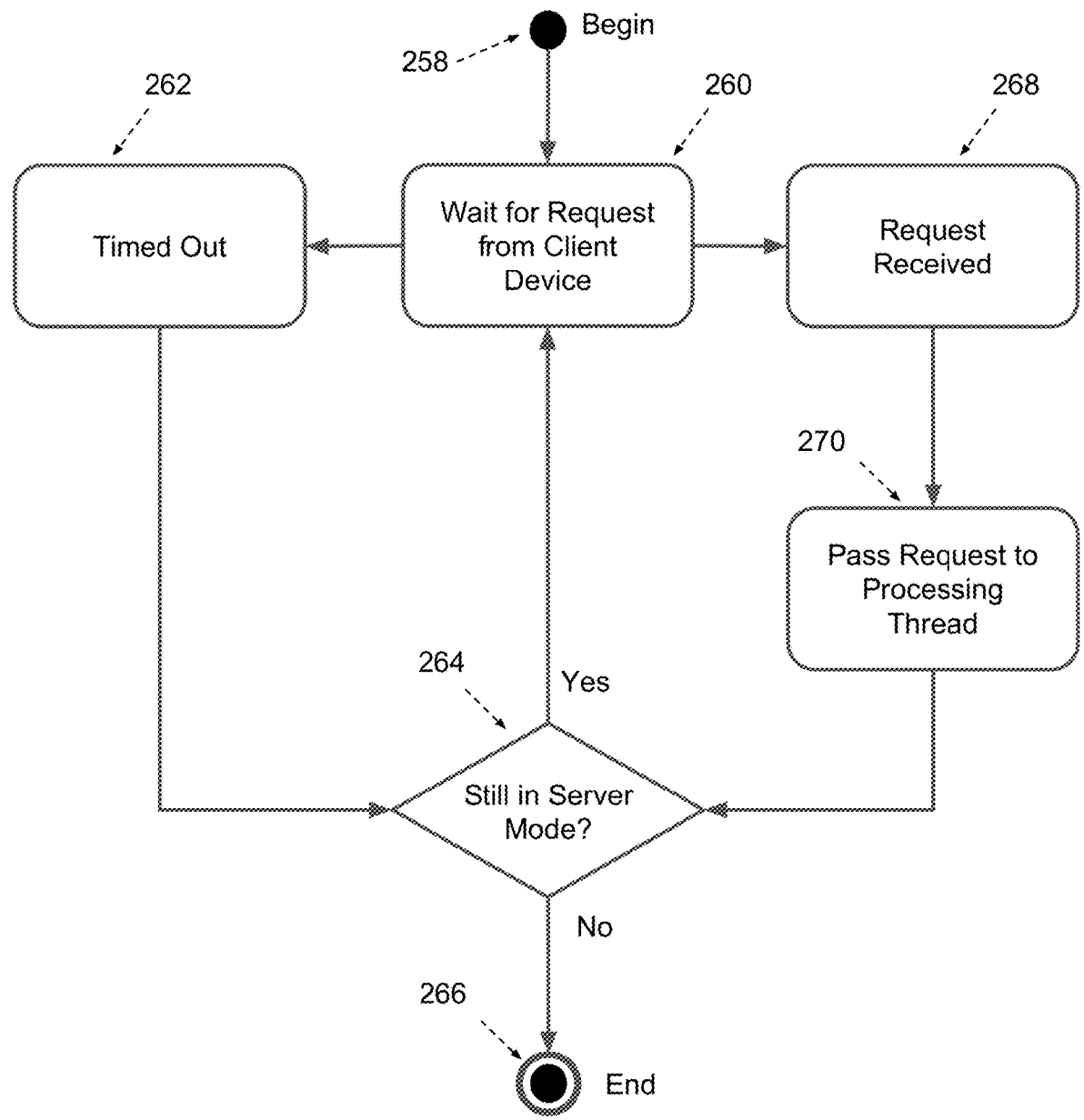

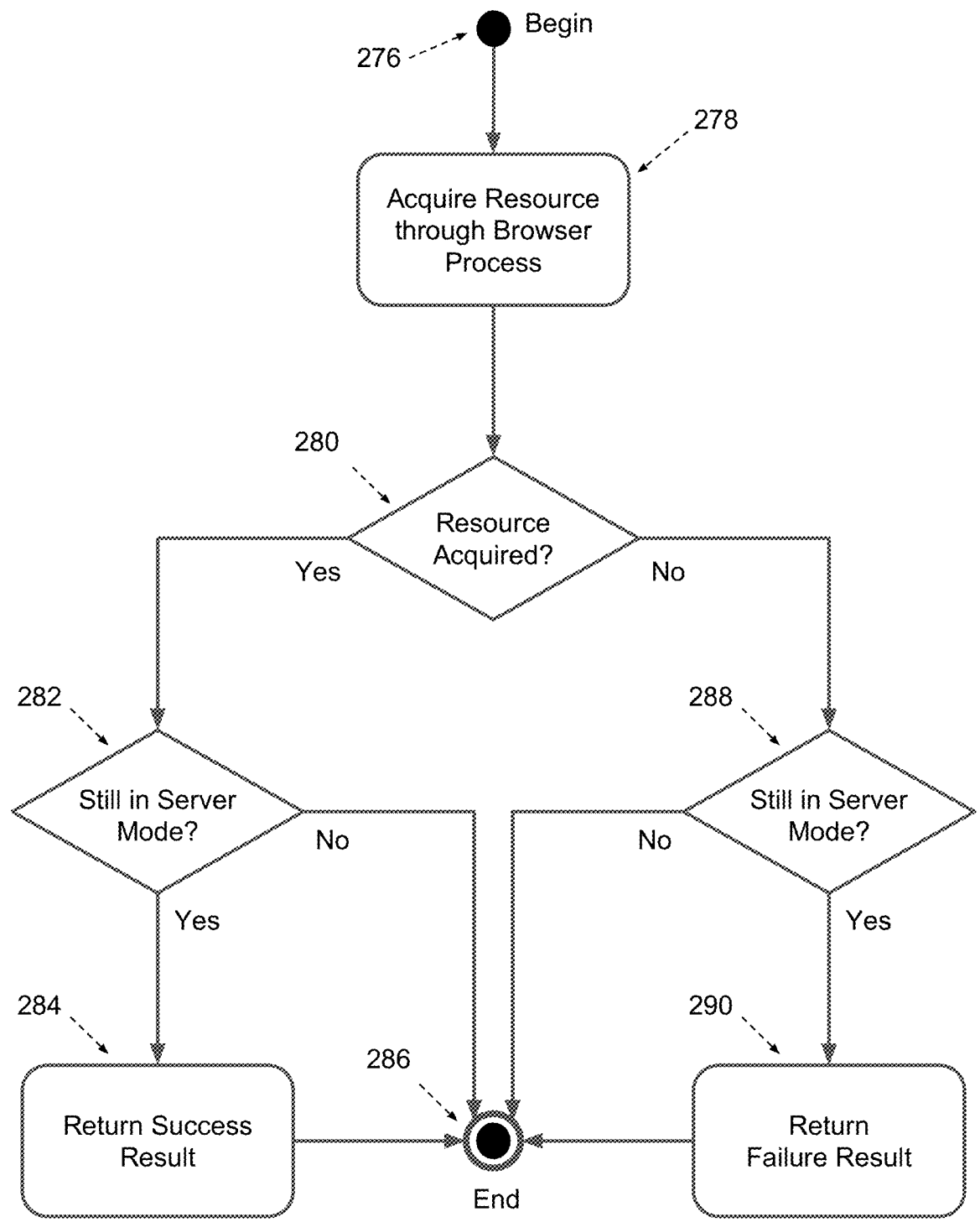
FIG. 11  Server Mode - Request Processing Thread

FIG. 12     Resource Switch - Requests
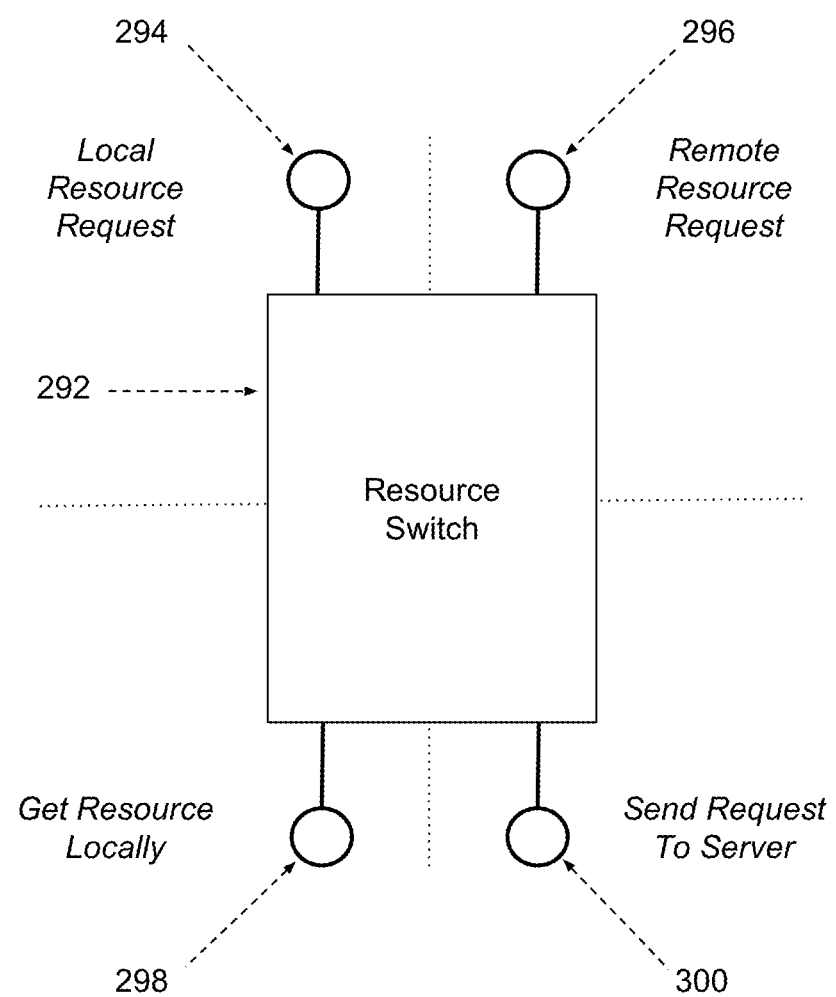

FIG. 13  Resource Switch - Local Request
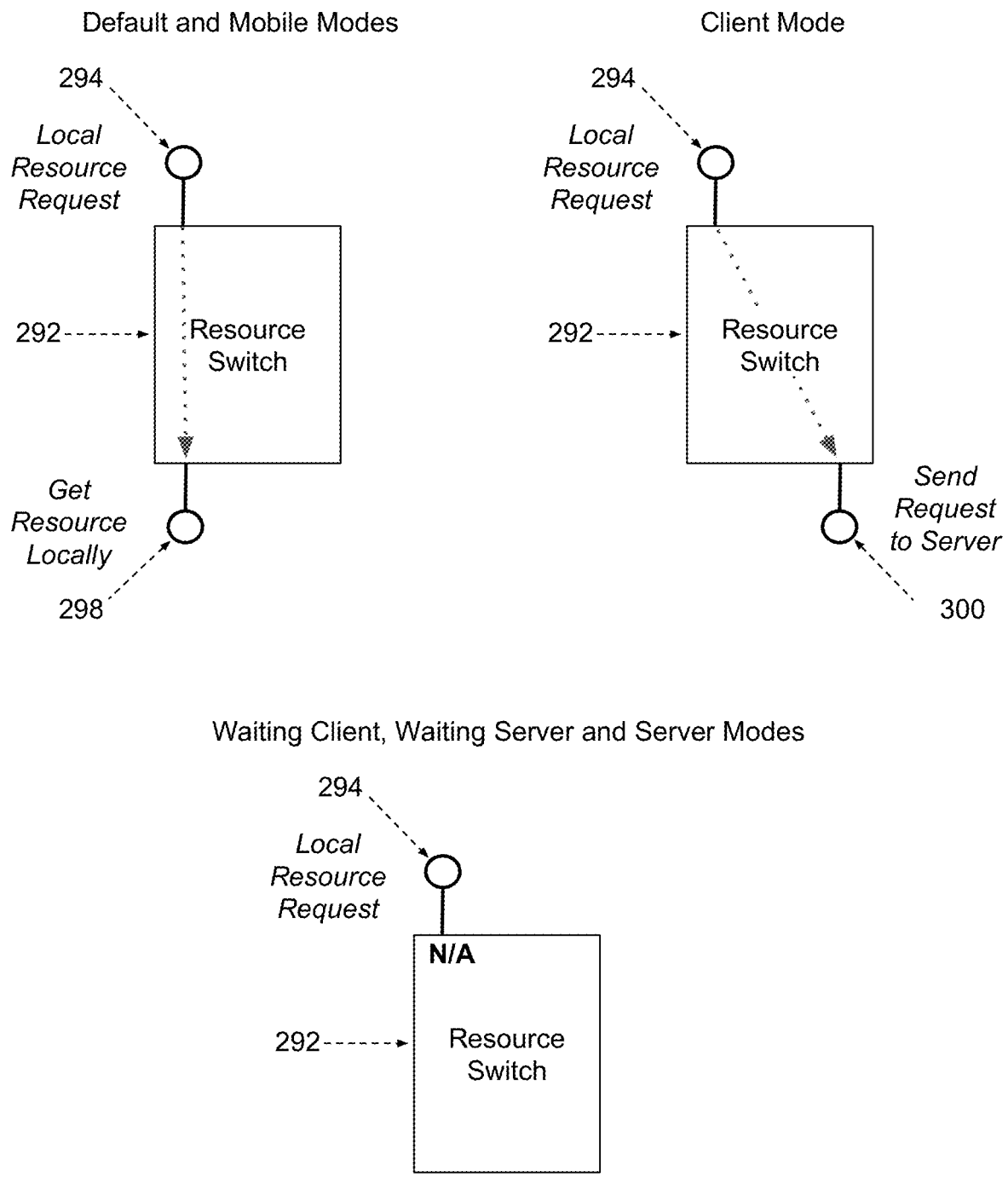

FIG. 14    Resource Switch - Remote Request
Server Mode
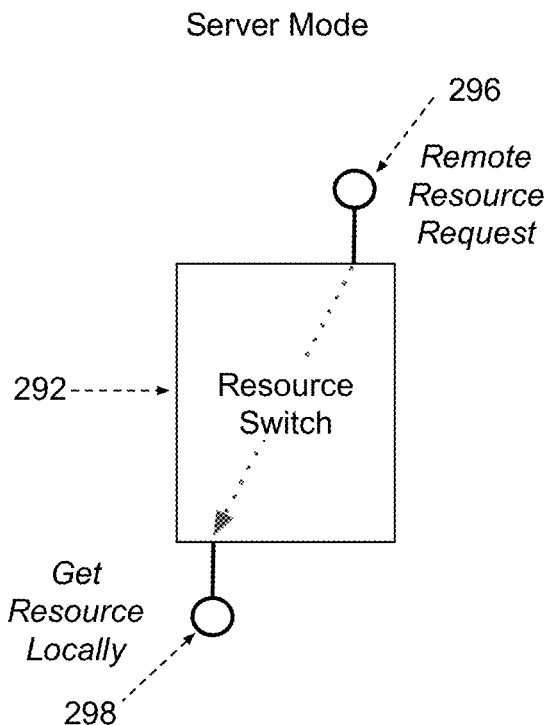
Waiting Client, Client, Waiting Server, Mobile and Default Modes
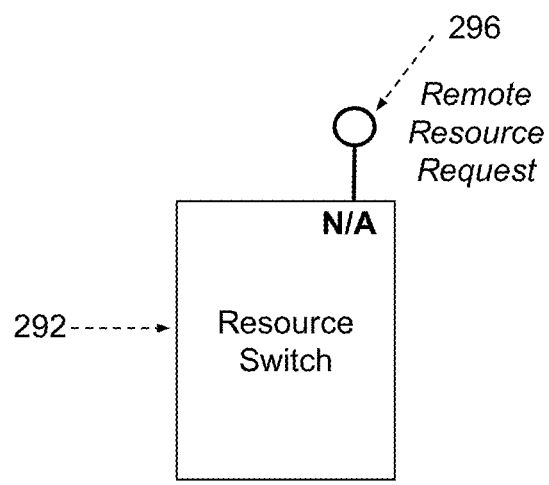

FIG. 15    Resource Switch - Resource Request Logic
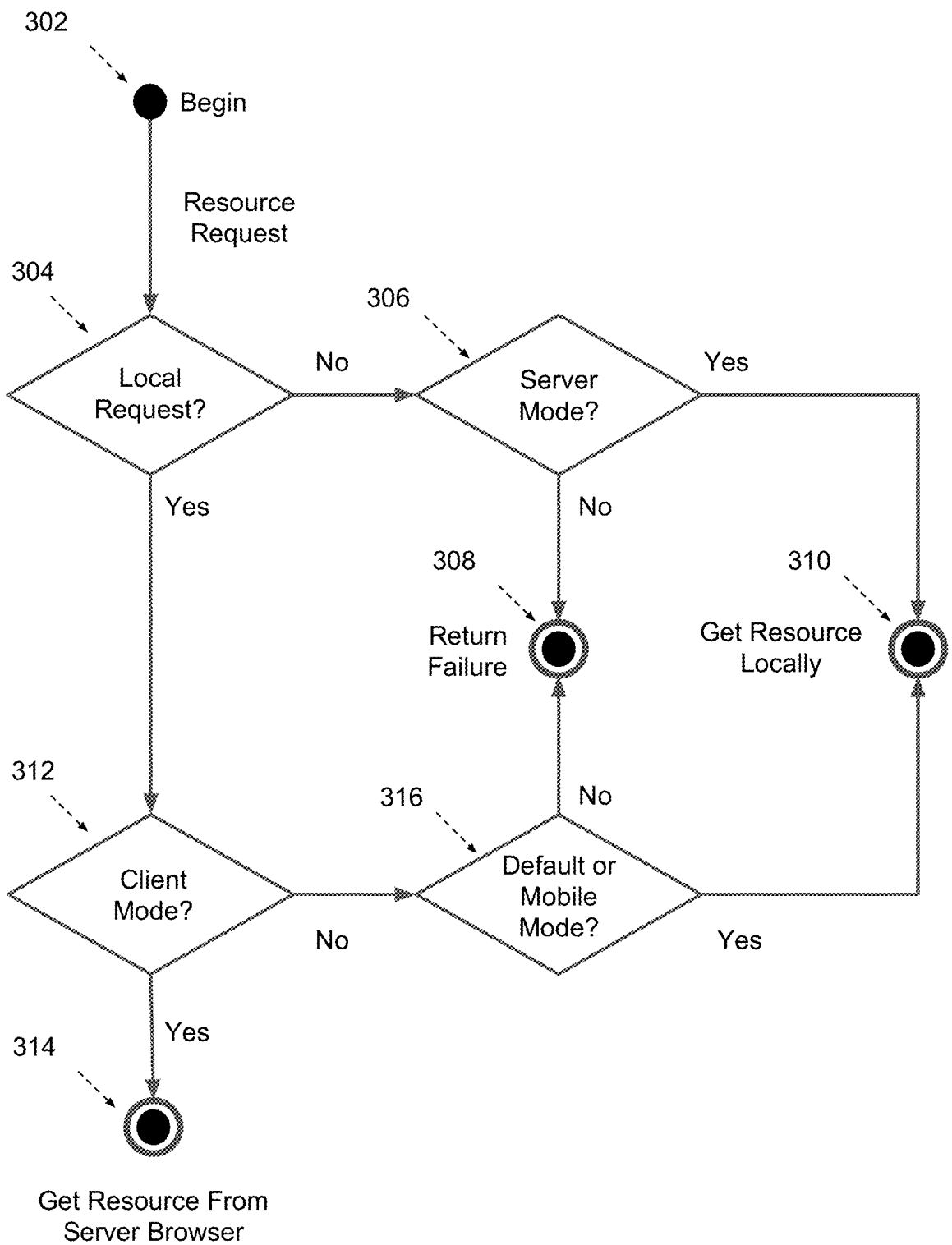

FIG. 16            Resource Switch - Responses
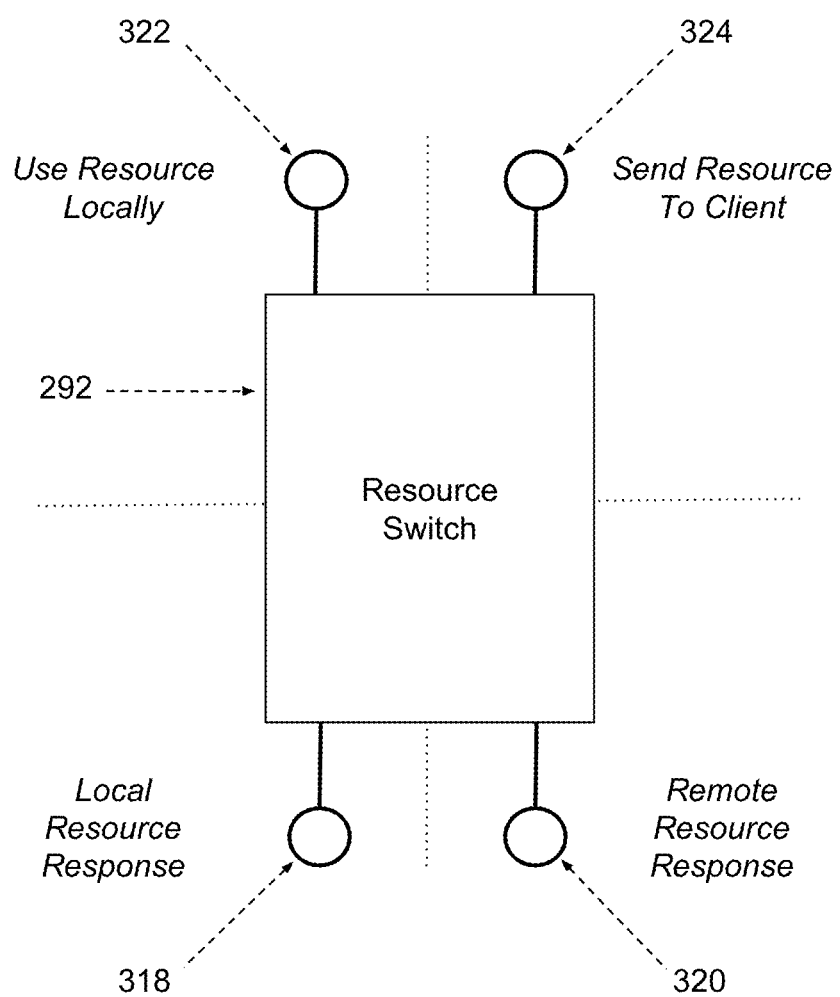

FIG. 17  Resource Switch - Local Response
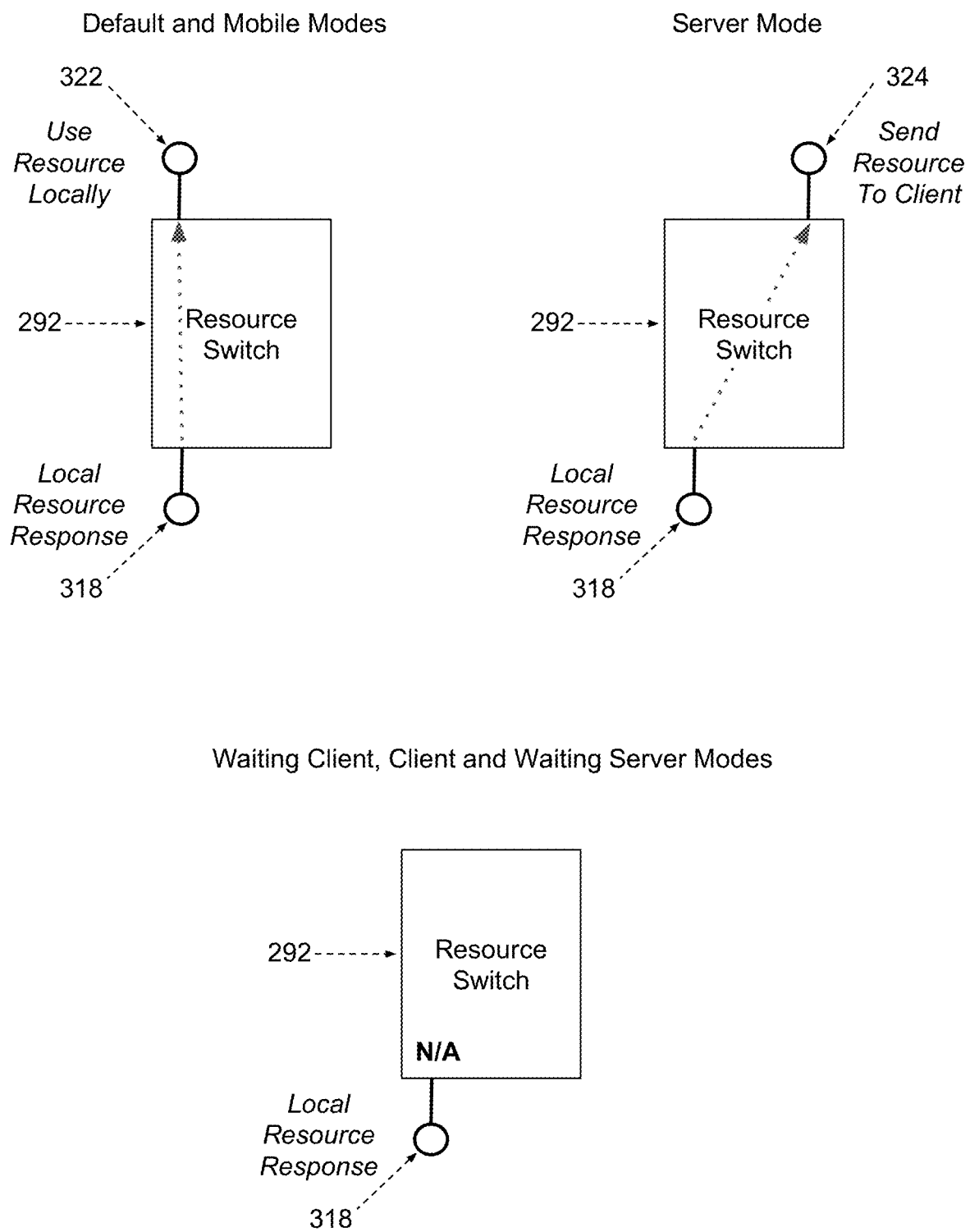

FIG. 18  Resource Switch - Remote Response
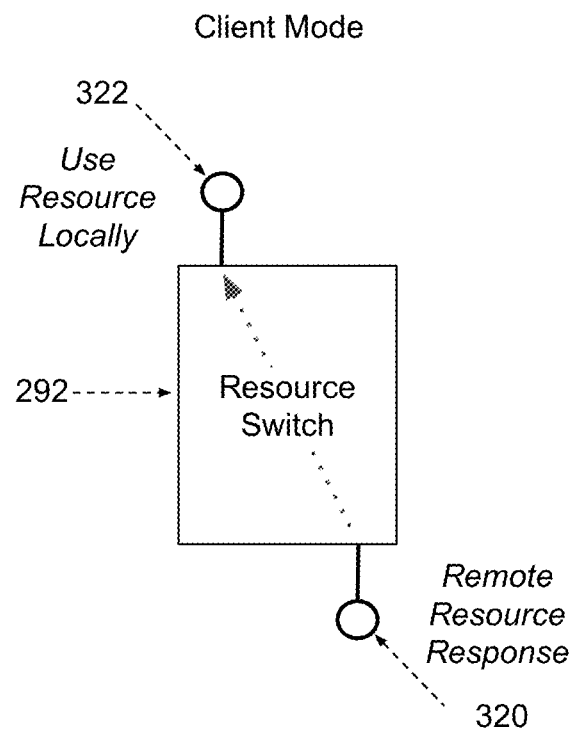
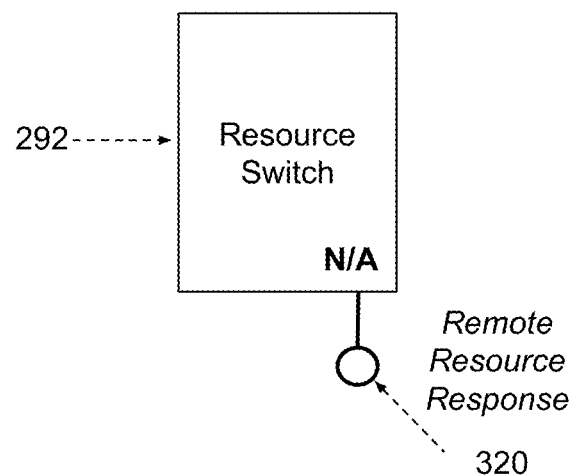

FIG. 19      Resource Switch - Resource Response Logic
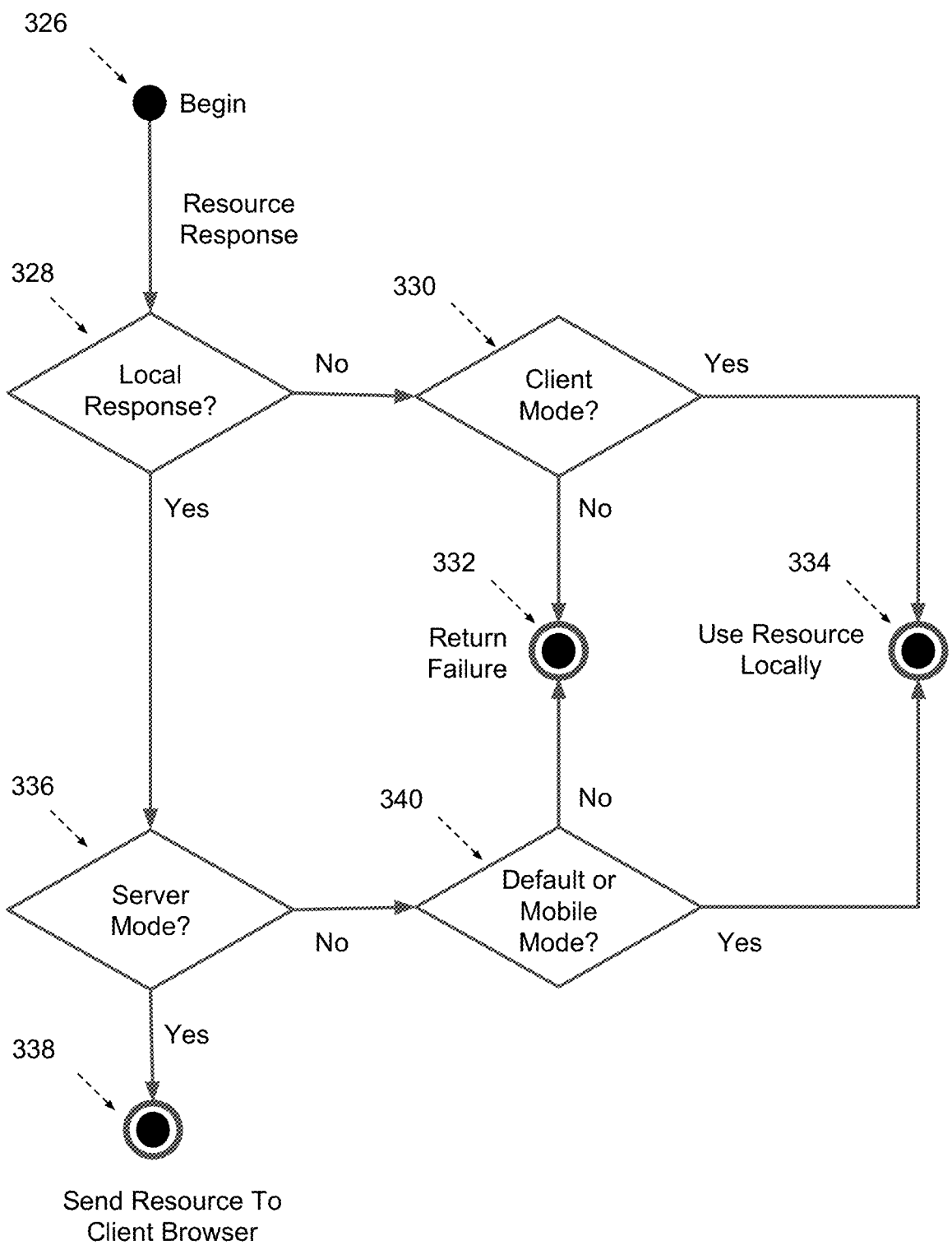

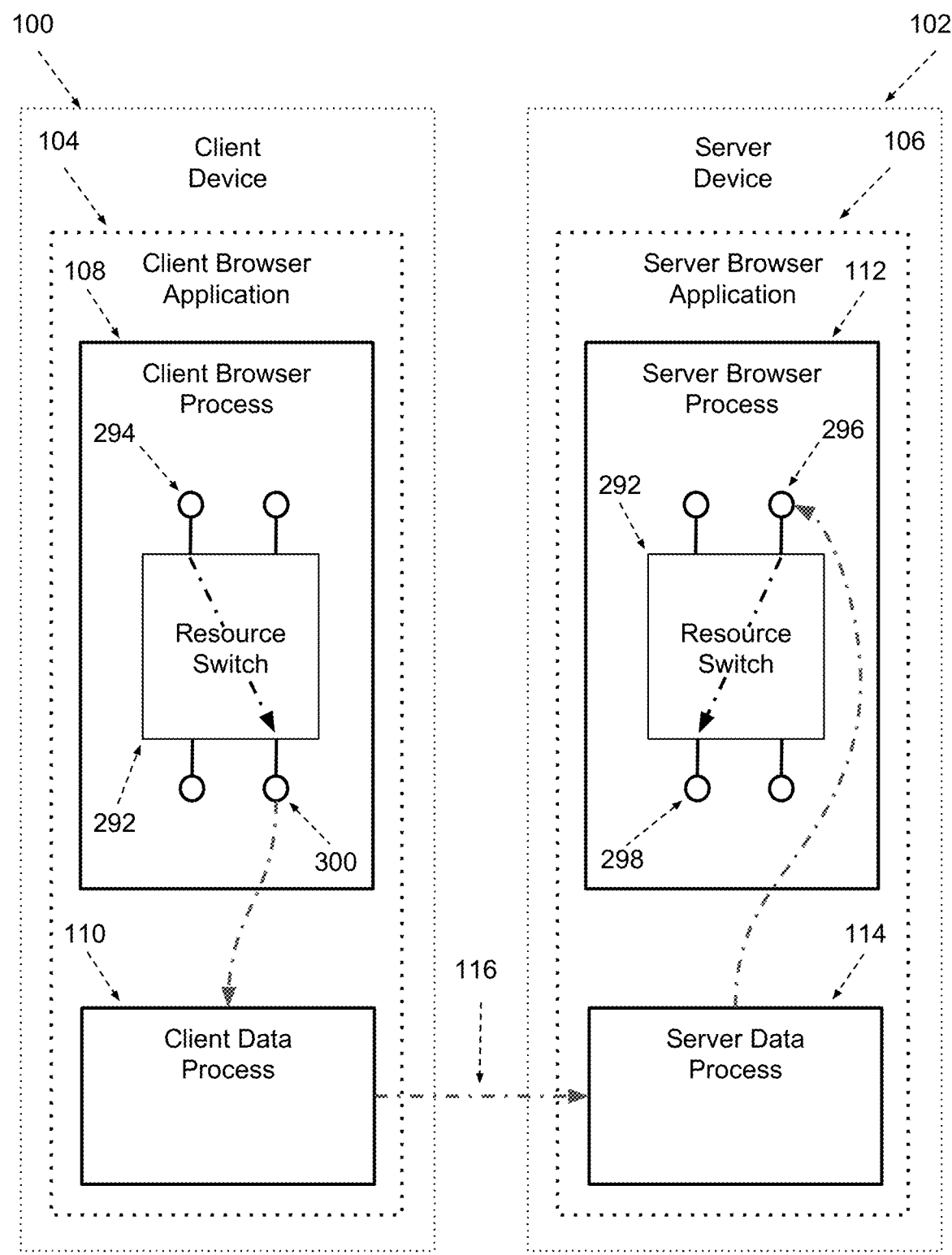
FIG. 20    Request from Client Device

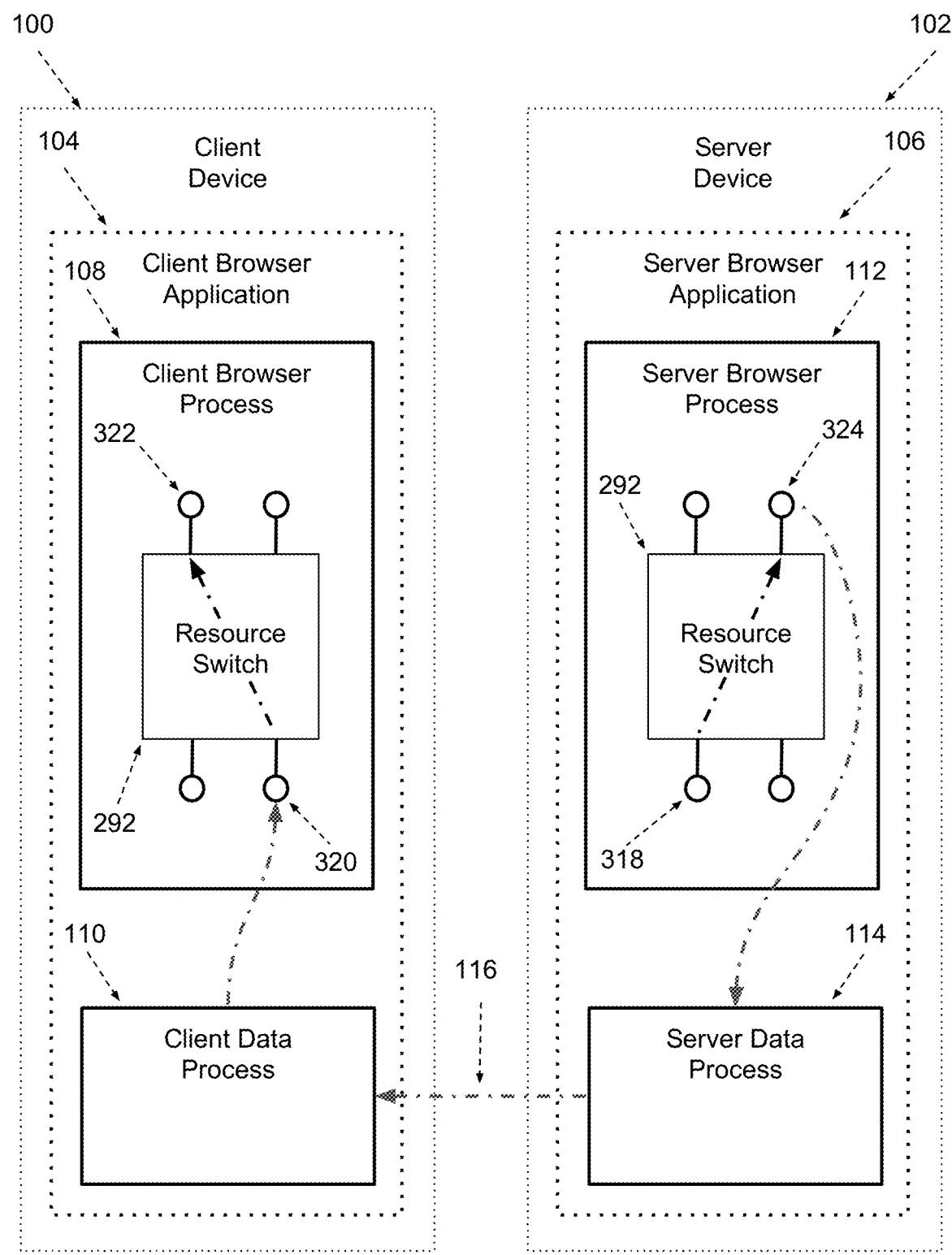
FIG. 21  Response from Server Device

DISTRIBUTED WEB BROWSER SOFTWARE ARCHITECTURE

CROSS-REFERENCE TO RELATED APPLICATIONS

This application claims priority to U.S. provisional application Ser. No. U.S. 62/538,153 filed on Jul. 28, 2017.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR OR A JOINT INVENTOR

Not Applicable

BACKGROUND OF THE INVENTION

Technical Field

The present invention generally relates to web browser software systems, and more particularly, to a distributed client/server web browser software architecture.

Background Art

Typically, web browser software applications reside on just one device, where they provide input and output functionality, as well as the acquisition of the resources necessary for rendering web pages. The web browser applications on mobile devices, such as smartphones, are limited in their ability to receive the productive input found on a full-sized computer keyboard, and in their ability to display complex web pages as can be done on a desktop, notebook or tablet computer.

As more people retire their desktop computers and become mobile-only users, the need to access complex web sites will necessitate either the purchase of replacement computers or the use of shared computers in a public domain. These devices will remain necessary so that users can be productive when using complex web sites. Purchasing a new computer is overkill for many users who only need to use a web browser application. Logging into a shared computer introduces security risks that many people do not feel comfortable with.

In addition, smartphone usage is increasing while desktop computer usage is remaining relatively flat. This indicates that there are many smartphone users who do not own another device for accessing web sites. Thus, there are many smartphone users who cannot efficiently work with complex web applications.

The prior art attempts to address this situation by providing docking devices that allow the user to connect a smartphone to a keyboard, mouse and monitor. Once that is done the monitor displays the smartphone applications and allows the user to interact with those applications using the keyboard and mouse. Such a solution is limited in that a particular brand of docking device only works with a particular type of smartphone. The prior art does not provide a general method for connecting any smartphone to a monitor, keyboard and mouse. This limits the use of such devices to just a small set of smartphone users.

The prior art also provides methods of screen mirroring or casting, where the output on the smartphone display is sent to a larger display, such as an HDTV device. Such methods do not have the input capability provided by the invention described herein, and thereby do not solve the problem of smartphone users being unable to easily work with complex web sites.

Accordingly, there exists a need for a method to connect any smartphone to input and output devices, such as a keyboard, mouse and monitor, in order to access and efficiently use complex web sites. Additionally, the method should ensure that the user's private information, such as passwords and profile data, will not be persisted outside of their smartphone, thus allowing the user to confidently use such a connection method, even in a public setting where they might otherwise worry about security.

BRIEF SUMMARY OF THE INVENTION

This invention pertains to the distributed web browser software architecture described herein. The preferred embodiment relies on several implementation-specific supporting components, such as the physical hardware and the operating system that host the browser application, and the methods of communication between entities in the overall system. Those components are necessary for the functioning of the distributed web browser, and those skilled in the art can choose the specific embodiment of each supporting component.

In one aspect of the preferred embodiment, a distributed web browser software architecture is comprised of a client browser software application and a server browser software application. The client browser application runs on a client device, such as a device with input and output capabilities, and the server browser application runs on a server device, such as a smartphone. The client and server devices host the distributed web browser software application described herein, and are not part of the invention. The client browser application accepts user input, such as from a keyboard or mouse, then renders and displays web pages in response to that input. The resources necessary for rendering web pages by the client browser application are acquired by requesting them from the server browser application. The server browser application, when running in a mode to acquire resources, does not accept user input or provide an output for display, but only responds to requests from the client browser application. The client and server browser application instances of the distributed web browser software application are linked by an implementation-specific communication connection that allows the client browser application to request resources from the server browser application, and the server browser application to return those resources to the client browser application. The connection between the client and server browsers will be such that multiple requests can be made simultaneously, thus allowing the client browser to run in a multi-threaded manner. All discussion herein of resource requests and responses refer to one of possibly many simultaneous resource requests and their corresponding responses.

The method of establishing a connection between the client and server browser applications is implementation specific and is not a part of the invention described herein. One exemplary method of establishing a connection would be a process such as that defined in US patent U.S. Pat. No. 9,521,589. Using such a method, both the client device and the server device would have Near-Field Communication (NFC) interfaces to provide NFC connection initiation. In addition, both the client and server devices would have WiFi interfaces to provide high-speed data transfer once the connection between the two devices has been established. Initiation of the NFC connection would occur when the server device is placed near the client device. A series of NFC handshake communications between the two devices, along with a manual confirmation from the user, would result in the establishment of a peer-to-peer WiFi Direct connection between the client and server devices. All further data transfer would occur over that WiFi Direct connection.

Similarly, the method of communication between the client and server devices is implementation specific, and is not a part of the invention described herein. One exemplary method of communication would be a plug-in communication framework, such as the gRPC remote procedure call (RPC) framework, which also provides bidirectional streaming. Using such a communications framework would allow a client-side process, when needing a resource, to issue a request command that would be executed by a server-side process. That would result in the server-side process acquiring the requested resource and returning it to the client-side process over the communication connection. Such a communications framework would also allow the opening of channels between the client and server devices in order to stream data necessary for the operation of the browser.

In another aspect of the preferred embodiment, the distributed web browser application can be instructed to run in one of several modes of operation, such as waiting-client mode, client mode, waiting-server mode, server mode, mobile mode or default mode. This will allow a single browser executable to be created that would, depending on the operational mode, take on the various roles of a distributed web browser software application, or act as a default non-distributed browser application, such as the web browser running on a conventional desktop computer.

In another embodiment, different browser executable types could be created, with each type having just the software components and functionality needed to run in the modes necessary for its use. For instance, a default browser executable would only run in a non-distributed default mode, while a client browser executable could run in waiting-client mode or client mode, and a server browser executable could run in waiting-server mode, server mode or mobile mode. In particular, this would be beneficial in reducing the size and resource requirements of the client browser executable, which would allow it to run on less expensive devices, since the client browser application would not need the resource acquisition functionality.

In another aspect of the preferred embodiment, the browser application on the client device will be started in waiting-client mode at device start-up. When in waiting-client mode the browser application will show a web page instructing the user how to connect, and will have a client data process. The client data process will periodically broadcast a signal, such a signal using NFC, to let nearby server devices know that the client device is available to establish a connection. When a connection to a server device is established, the client browser application will change to run in client mode. The client-mode browser application will provide a traditional web browser experience to the user, and will run using the connected user's profile information, which it will retrieve from the server browser application. When in client mode, the client data process will be responsible for sending resource requests to the server browser application running on the server device.

In another aspect of the preferred embodiment, the browser application on the server device will be started in waiting-server mode at device start-up. When in waiting-server mode the browser application will display no user interface, and will have a server data process. The server data process will periodically listen for an availability signal from a client device, and, on receipt of such a signal, provide an implementation-specific notification to the server device user of an available client device, such as by displaying a message or icon on the server device notification or status area. The user will be able to either cancel the notification or instruct the server data process to establish a connection with the client device.

In another aspect of the preferred embodiment, when a connection is made between a server device and a client device, the browser application running on the server device will change to run in server mode. When in server mode, the server data process will be responsible for accepting resource requests from the client browser application running on the client device and returning resource responses to that client browser application.

In another aspect of the preferred embodiment, when the user of the server device manually launches the browser application on the server device, any connection to a client device will be closed and the browser application running on the server device will change to run in mobile mode. When in mobile mode the browser application will act as a non-distributed browser application, similar to default mode with an interactive user interface, but will run a server data process in order watch for client devices and to notify the user of their availability. When the mobile-mode browser application user selects a client device and instructs the browser application to connect to it, the browser application on the server device will close its user interface and change to run in server mode. Alternatively, when the server device user manually closes the mobile-mode browser application window, the browser application on the server device will close its user interface and change to run in waiting-server mode.

In another aspect of the preferred embodiment, a software component of the browser application referred to hereinafter as the resource switch will be responsible for routing resource requests and responses. Routing logic will be driven by browser operation mode, and on whether the request or response to be routed is from a local or remote source. For instance, when in default or mobile mode, local resource requests will be directed by the resource switch to be acquired locally, but when in client mode, the resource switch will direct local resource requests to be acquired remotely by requesting them from the server browser application. When in server mode the resource switch directs remote resource requests from a client device to be acquired locally. Similarly, when in default or mobile mode, local resource responses will be directed by the resource switch to be used locally by the browser application, but when in server mode, local resource responses will be directed by the resource switch to be sent to the client browser application. When in client mode, remote resource responses sent from the server browser application will be used locally by the client browser application.

In another aspect of the preferred embodiment, the browser application state that is presented to the user when using the client browser application on the client device will be the same as the browser application state presented when launching the mobile-mode browser application on the server device. For instance, any websites that had been open in the mobile-mode browser application will be displayed by the client-mode browser application. This is accomplished by the client-mode browser application requesting browser state information from the server-mode browser application through the client/server data processes and the client/server communication connection.

In another aspect of the preferred embodiment, user input on the browser application running in client mode on the client device will result in the resource switch component of the client browser process sending a resource request to the client data process. The client data process will then send a resource request over the client/server communication connection to the server data process. On receiving the resource request, the server data process will send the resource request to the server browser process. The resource switch component of the server browser process will route that request such that the requested resource is acquired locally by the server browser process. Once acquired, the resource switch component of the server browser process will route the resource to the server data process as a resource response. The server data process will then send that resource response over the client/server communication connection to the client data process. On receiving the resource response, the client data process will send it to the client browser process. The resource switch component of the client browser process will route the resource response such that the client browser process uses the resource it contains to present the appropriate browser state to the user. This process can occur either as a discreet request/response event to acquire a specific resource, or as long-term bidirectional channels opened to service stream requests. In addition, multiple, simultaneous request/response events can exist in order to provide a responsive experience to the client browser user.

In another aspect of the preferred embodiment, nothing is persisted on the client device that would identify the user or reveal the content received from the server device during the browser application session. Any cached data will exist only on the server device. All data received by the client-mode browser application from the server-mode browser application is used for rendering web pages and is not saved on the client device in any way. Any browser state that needs to be saved due to using the client browser will be sent from the client browser to the server browser and saved on the server device. Any such saved browser state will present itself when the mobile-mode browser application is subsequently opened on the server device, or when the server device user later connects to a client device.

BRIEF DESCRIPTION OF THE SEVERAL VIEWS OF THE DRAWINGS

FIG. 1 provides an overall view of the distributed web browser software architecture, with the client browser application running on the client device and the server browser application running on the server device.

FIG. 2 provides state machine diagrams showing browser application mode of operation changes due to system events.

FIG. 3 illustrates a flowchart for the browser application when running in waiting-client mode and broadcasting its availability to server devices.

FIG. 4 illustrates a flowchart for the browser application when running in waiting-server mode and watching for client devices to connect to.

FIG. 5 illustrates a flowchart for a health check loop when the browser application is running in client mode.

FIG. 6 illustrates a flowchart for a health check loop when the browser application is running in server mode.

FIG. 7 illustrates a flowchart showing a resource request made by an instance of the browser application running in client mode being serviced by another instance of the browser application running in server mode.

FIG. 8 illustrates a flowchart showing how the client data process of the browser application running in client mode processes a resource request from the client browser process.

FIG. 9 illustrates a flowchart showing how the client data process of the browser application running in client mode processes a request to be sent to the server device.

FIG. 10 illustrates a flowchart showing how the server data process of the browser application running in server mode processes a request from the client device.

FIG. 11 illustrates a flowchart showing how the server data process of the browser application running in server mode processes a resource request by acquiring that resource through the server browser process.

FIG. 12 illustrates the resource switch software component of the browser application browser process, and the endpoints it provides when routing resource requests.

FIG. 13 illustrates how local resource requests are routed by the resource switch when the browser application is running in different modes.

FIG. 14 illustrates how remote resource requests are routed by the resource switch when the browser application is running in different modes.

FIG. 15 illustrates a flowchart showing how resource requests are processed by the resource switch.

FIG. 16 illustrates the resource switch software component of the browser application browser process, and the endpoints it provides when routing resource responses.

FIG. 17 illustrates how local resource responses are routed by the resource switch when the browser application is running in different modes.

FIG. 18 illustrates how remote resource responses are routed by the resource switch when the browser application is running in different modes.

FIG. 19 illustrates a flowchart showing how resource responses are processed by the resource switch.

FIG. 20 illustrates an overall view of a resource request being routed from the client browser application to the server browser application.

FIG. 21 illustrates an overall view of a resource response being routed from the server browser application to the client browser application.

DETAILED DESCRIPTION OF THE INVENTION

Hereinafter, exemplary embodiments of the present disclosure will be described in detail with reference to the accompanying drawings. While the disclosure has been described with reference to specific details, such as detailed components and flowcharts, these are only examples to facilitate the overall understanding of the disclosure, and thus the disclosure is not limited thereto. It will be understood by those skilled in the art, that various modifications and alterations may be made.

A web browser is a software application for receiving, presenting and interacting with resources on the World Wide Web, and will be referred to hereinafter as a browser. This invention describes a distributed browser software architecture where the distributed browser is comprised of a client browser and a server browser. The client browser is a browser application running in one of several client modes of operation. A server browser is a browser application running in one of several server modes of operation. The mode of operation is initially determined when the browser is launched, and its initialization is an implementation detail, such as passing the browser a startup flag or instructing the browser to read a startup mode from a system data store. An implementation specific communication connection is established between the client and server browser applications to make them work together as a distributed browser application.

Hereinafter a device refers to an entity comprised of computer hardware having an operating system that runs a browser application. A client device runs a client browser and provides input and display for the client browser user. A server device runs a server browser and acquires resources for a client browser. Exemplary resources are remote information, such as might be referenced by a Uniform Resource Identifier (URI/URL), or local information found on the server device, such as user profile data or Secure Sockets Layer (SSL) certificates. A method of communicating between the client device and the server device is a necessary part of the distributed browser architecture, but is implementation specific and is not a part of the invention described herein.

FIG. 1 illustrates a client device 100 that runs a client browser application 104. The client browser 104 has, at a minimum, a browser software process 108, which is responsible for the general operation of the browser, and a data software process 110, which is responsible for connection establishment and data transfer between the client and server browsers. The client browser process 108 requests the resources necessary for its operation from the client data process 110. The client data process 110 requests those resources over the communication connection 116 provided by the client device 100. The client device 100 provides input connections 118 and 120 for the connection of input devices 122 and 124. The client device 100 also provides an output connection 126 for the connection of an output device 128.

FIG. 1 also illustrates a server device 102 that runs a server browser application 106. The server browser has, at a minimum, a browser software process 112, which is responsible for the general operation of the browser, and a data software process 114, which is responsible for connection establishment and data transfer between the server and client browsers. The server data process 114 receives resource requests from the client data process 110 over the communication connection 116. The server data process 114 sends the resource requests to the server browser process 112. The server browser process 112 acquires the requested resources and sends them back, along the same path, to the client browser 104 for use in rendering output for display. The communication channel 116 will be such that several resource requests can be handled simultaneously in order to maintain a responsive client browser experience.

FIG. 2 illustrates the distributed browser software application modes of operation 130. When in default mode 132 the distributed browser software application is a single executable and operates like a conventional web browser. The other modes of operation 130 make an instance of the distributed browser act as a client browser or a server browser. An instance of the distributed browser acts as a client browser when in waiting-client mode 134 or client mode 138. An instance of the distributed browser acts as a server browser when in waiting-server mode 142, server mode 146 or mobile mode 152.

FIG. 2 also illustrates the mode state transitions that take place in the client browser. When in waiting-client mode 134 an accept server connection event 136 results in the mode of operation changing to client mode 138. When in client mode 138 a close connection event 140 results in the mode of operation changing to waiting-client mode 134.

FIG. 2 also illustrates the mode state transitions that take place in the server browser. When in waiting-server mode 142 a connect to client event 144 results in the mode of operation changing to server mode 146. When in server mode 146 a disconnect from client event 148 results in the mode of operation changing to waiting-server mode 142. When in waiting-server mode 142 a manual browser launch event 150 results in the mode of operation changing to mobile mode 152. Similarly, when in server mode 146 a manual browser launch event 154 results in the mode of operation changing to mobile mode 152. When in mobile mode 152 a connect to client event 156 results in the mode of operation changing to server mode 146. When in mobile mode 152 a manual close browser event 158 results in the mode of operation changing to waiting-server mode 142.

FIG. 3 illustrates a client availability broadcast processing loop that runs on the client data process when the client browser is in waiting-client mode. The broadcast loop begins 160 by broadcasting its availability 162 to server browsers. The broadcast loop then checks if any connection requests were received 164. If a connection request was received, then the broadcast loop establishes a connection 166 with the server browser making the connection request and changes the client browser mode of operation to client mode 168. If a connection request was not received, then the broadcast loop pauses 170, then returns to broadcast its availability again 162.

FIG. 4 illustrates a client discovery processing loop that runs on the server data process when the server browser is in waiting-server mode. The discovery loop begins 172 by checking if a client availability broadcast was found 174. If it was, then the discovery loop checks to see if the user wants to connect to an available client browser 176. The method of notifying the user of available client browsers and handling user input when choosing a client browser to connect to is implementation specific, and is not a part of this invention. If the user wants to connect to an available client browser, then a connection is established 178 and the server browser mode of operation changes to server mode 180. If an available client was not found, or if the user has not chosen to connect to an available client, then the discovery loop pauses 182, then returns to check if a client availability broadcast was found 174.

FIG. 5 illustrates a health check processing loop that runs in the client data process when the client browser is in client mode. The health check loop begins 184 by sending a ping to the server browser 186. It then checks to see if a response to the ping was received 188. If a response was received, then the health check loop pauses 190, then loops back to send another ping to the server browser 186. If a response was not received, then the health check loop closes the server browser connection 192 and the client browser mode of operation changes to waiting-client mode 194.

FIG. 6 illustrates a health check processing loop that runs in the server data process when the server browser is in server mode. The health check loop begins 196 by checking if a ping has been recently received 198 from the client browser. If it has, then the health check loop returns a ping response 200, then returns to check if a ping has been received 198. If a ping has not been received, then the health check loop closes the client browser connection 202 and the server browser mode operation changes to waiting-server mode 204.

FIG. 7 illustrates the flow of a resource request and an associated response through the distributed browser. The client browser on the client device 100 has, at a minimum, a client browser process 108 and a client data process 110. Similarly, the server browser on the server device 102 has, at a minimum, a server browser process 112 and a server data process 114. When some operational task of the client browser process 108 needs a resource 206 it sends a resource request 208 to the client data process 110. The client data process 110 receives the resource request 208 and sends a resource request 210 over the communication connection between the client device 100 and the server device 102. The server data process 114 receives the resource request 210 from the communication connection and sends a resource request 212 to the server browser process 112. The server browser process 112 receives the resource request 212 and acquires the requested resource 214, then sends a resource response 216 to the server data process 114. The server data process 114 receives the resource response 216, then sends a resource response 218 on the communication connection to the client data process 110 on the client device 100. The client data process 110 receives the resource response 218 from the communication connection, then sends a resource response 220 to the client browser process 108. The client browser process 108 receives the resource response 220, then uses the data contained in the resource response 222 for whatever operational task initially required the resource.

FIG. 8 illustrates the resource request watch loop that runs in the client data process when the client browser is in client mode. The resource request loop begins 224 by waiting for a resource request 226 sent from resource switch component of the client browser process. If the wait times out 228, then a check is made to see if the browser is still in client mode 230. If the browser is not in client mode, then the resource request watch loop ends 232. If, on the other hand, the browser is still in client mode, then the resource request watch loop again waits for a resource request 226. If a request is received 234, then the request is passed to a thread of operation 236 that sends the resource request to the server device. A check is then made to see if the browser is still in client mode 230. If the browser is not in client mode, then the resource request watch loop ends 232. If, on the other hand, the browser is still in client mode, then the resource request watch loop again waits for a resource request 226.

FIG. 9 illustrates the logic of the client data process request processing thread that handles local resource requests when the client browser is running in client mode. One such thread runs for each resource request being processed. The processing thread begins 242 by sending a resource request to the server device 244. The processing thread then checks to see if a response was received in a timely manner 246. If a response was received, then a check is made to see if the client browser is still in client mode 248. If the client browser is in client mode, then a success response containing the requested resource is returned to the client browser process 250 and the processing thread exits 252. If the client browser is not in client mode, then the processing thread exits 252 without returning a success response. If a response was not received 246, then a check is made to see if the client browser is still in client mode 254. If the client browser is in client mode, then a failure response is returned to the client browser process 256 and the processing thread exits 252. If the client browser is not in client mode, then the processing thread exits 252 without returning a failure response.

FIG. 10 illustrates the resource request watch loop that runs on the server data process when the server browser is in server mode. The resource request watch loop begins 258 by waiting for a resource request 260 from the client device. If the wait times out 262, then a check is made to see if the browser is still in server mode 264. If the browser is not in server mode, then the resource request watch loop ends 266. If, on the other hand, the browser is still in server mode, then the resource request watch loop again waits for a resource request 260. If a request is received 268, then the request is passed to a thread of operation 270 that acquires the requested resource. A check is then made to see if the browser is still in server mode 264. If the browser is not in server mode, then the resource request watch loop ends 266. If, on the other hand, the browser is still in server mode, then the resource request watch loop again waits for a resource request 260.

FIG. 11 illustrates the logic of the server data process request processing thread that handles remote resource requests when the server browser is running in server mode. One such thread runs for each resource request being processed. The processing thread begins 276 by acquiring the requested resource 278 through the capabilities of the server browser process. The processing thread then checks to see if the resource was acquired in a timely manner 280. If a response was acquired, then a check is made to see if the server browser is still in server mode 282. If the server browser is in server mode, then a success response containing the requested resource is returned to the client device 284 and the processing thread exits 286. If the server browser is not in server mode, then the processing thread exits 286 without returning a success response. If a response was not acquired 280, then a check is made to see if the server browser is still in server mode 288. If the server browser is in server mode, then a failure response is returned to the client device 290 and the processing thread exits 286. If the server browser is not in server mode, then the processing thread exits 286 without returning a failure response.

FIG. 12 illustrates the resource switch 292 software component of the distributed browser software. Both the client browser process and the server browser process, having the same code base, have a resource switch 292 component. The resource switch 292 is responsible for routing resource requests and responses. The resource switch 292 routing is determined by the operational mode of the browser instance it is a part of, as well as the type of requests and responses encountered. The resource switch 292 can receive local resource requests 294 or remote resource requests 296. Local resource requests 294 are resource requests that come from the same browser application instance that the resource switch 292 is a component of. Remote resource requests 296 are resource requests that come from a different instance of the browser application. Specifically remote resource requests 296 are resource requests from a client browser to a server browser. Therefore, remote resource requests 296 are only encountered by a resource switch 292 when the browser instance is running in server mode. The resource switch 292 can acquire resources either locally 298 or remotely 300 from the connected server browser. Acquiring a resource locally 298 means getting the resource from the capabilities of the browser instance that the resource switch is a part of, and could be either an on-device resource, such as from the device data store, or an off-device resource, such as through a network request. Acquiring a resource remotely 300 means getting the resource from another instance of the browser application. Specifically, the resource switch 292 gets a resource remotely 300 by sending a resource request to an instance of the browser application running in server mode. Therefore, acquiring resources remotely only occurs when the browser instance is running in client mode.

FIG. 13 illustrates how the resource switch 292 routes local resource requests 294 for different browser operation modes. When the browser is in default or mobile mode, a local resource request 294 is serviced by getting the resource locally 298. When the browser is in client mode, a local resource request 294 is serviced by getting the resource remotely 300. When the browser is in waiting-client mode, waiting-server mode or server mode, a local resource request 294 is handled by sending a failure message to the requestor.

FIG. 14 illustrates how the resource switch 292 routes remote resource requests 296 for different browser operation modes. When the browser is in server mode a remote resource request 296 is serviced by getting the resource locally 298. When the browser is in any other operational mode, a remote resource request 296 is handled by sending a failure message to the requestor.

FIG. 15 illustrates the logic used by the resource switch when a resource request is received 302. The request is examined 304 to see if it is a local request or a remote request. If the request is a remote request, then a check is made to see if the browser is running in server mode 306. If the browser is not in server mode, then a failure message is returned 308. If, on the other hand, the browser is in server mode, then the resource is acquired locally 310. If the request is a local request 304, then a check is made to see if the browser is running in client mode 312. If the browser is in client mode, then the resource is acquire remotely 314. If, on the other hand, the browser is not in client mode, then a check is made to see if the browser is running in either default or mobile mode 316. If the browser is not in default or mobile mode, then a failure message is returned 308. Otherwise, the resource is acquired locally 310.

FIG. 16 illustrates how resource responses are handled by the resource switch 292 software component of the distributed browser software. The resource switch 292 can receive local resource responses 318 or remote resource responses 320. Local resource responses 318 come from the same browser application instance that the resource switch 292 is a component of. Remote resource responses 320 come from a different instance of the browser application. Specifically, remote resource responses are resource responses from a server browser to a client browser. Therefore, remote resource responses 320 are only encountered by a resource switch 292 when the browser instance is running in client mode. The resource switch 292 can use responses locally 322 or send them to a client browser 324. Using a resource locally 322 means providing the resource to the same browser instance that the resource switch 292 is a part of. Sending a resource to a client browser 324 means sending a resource response to an instance of the browser application running in client mode. Therefore, resource responses to a client browser only happen when the browser instance is running in server mode.

FIG. 17 illustrates how the resource switch 292 routes local resource responses 318 for different browser operation modes. When the browser is in default or mobile mode, a local resource response 318 is serviced by sending the resource to the requesting component of the browser for local use 322. When the browser is in server mode, a local resource response 318 is serviced by sending the response to the client browser 324 needing the resource. When the browser is in waiting-client mode, client mode or waiting-server mode, a local resource response 318 is handled by sending a failure message to the requestor.

FIG. 18 illustrates how the resource switch 292 routes remote resource responses 320 for different browser operation modes. When the browser is in client mode a remote resource response 320 is serviced by sending the resource to the requesting component of the browser for local use 322. When the browser is in any other operational mode, a remote resource response 320 is handled by sending a failure message to the requestor.

FIG. 19 illustrates the logic used by the resource switch when a resource response is received 326. The response is examined 328 to see if it is a local response or a remote response. If the resource is a remote response, then a check is made to see if the browser is running in client mode 330. If the browser is not in client mode, then a failure message is returned 332. If, on the other hand, the browser is in client mode, then the resource is used locally 334. If the response is a local response 328, then a check is made to see if the browser is running in server mode 336. If the browser is in server mode, then the resource is sent to the client browser 338. If, on the other hand, the browser is not in server mode, then a check is made to see if the browser is running in either default or mobile mode 340. If the browser is not in default or mobile mode, then a failure message is returned 332. Otherwise, the resource is used locally 334.

FIG. 20 illustrates a resource request from a client device 100 to a server device 102. The client device 100 runs an instance of the browser in a client mode as a client browser 104. The server device 102 runs an instance of the browser in a server mode as a server browser 106. The client browser 104 has a client browser process 108 and a client data process 110. The server browser 106 has a server browser process 112 and a server data process 114. The resource switch 292 component of the client browser process 108 receives a local resource request 294 and requests that resource remotely 300 through the client data process 110 over a communication connection 116 between the client device 100 and the server device 102. The server data process 114 receives the resource request from the communication connection 116 and sends it to the server browser process 112. The resource switch 292 component of the server browser process 112 receives a remote resource request 296 and acquires that resource locally 298 from the server device.

FIG. 21 illustrates a resource response from a server device 102 to a client device 100. The server browser process 112 of the server browser 106 acquires the resource and sends it as a locally acquired resource 318 to the resource switch 292 component of the server browser process 112. The resource switch 292 sends the resource 324 through the server data process 114 to the client data process 110 over the communication connection 116 between the server device 102 and the client device 100. The client data process 110 sends the resource to the resource switch 292 component of the client browser process 108, which receives it as a remote resource response 320 and routes the resource to be used locally 322.

Since various substitutions, changes, and modifications may be made by those of ordinary skill in the art without departing from the technical spirit of the present disclosure, the above-described present disclosure is not limited by the foregoing embodiment and drawings.

SEQUENCE LISTING

Not Applicable

The invention claimed is:

1. A method of forming a multi-mode distributed web browser software application running on a smartphone and a user interface device, the method comprising:
   a distributed web browser software application capable of running in default mode, mobile mode, waiting-server mode, server mode, waiting-client mode or client mode;
   a client web browser, being an instance of said distributed web browser software application running in waiting-client mode or client mode on a user interface device;
   a server web browser, being an instance of said distributed web browser software application running in waiting-server mode, server mode or mobile mode on a smartphone;
   a default web browser, being an instance of said distributed web browser software application running in default mode when the functionality of a conventional, non-distributed web browser application is desired;
   said client web browser, when in waiting-client mode, periodically broadcasting an availability message;
   said server web browser, when in waiting-server mode or mobile mode, periodically checking for said availability messages from client web browsers;
   said server web browser, when in waiting-server mode or mobile mode, and having found one or more available client web browsers, notifying said smartphone user of said available client web browsers;
   said server web browser, when in waiting-server mode or mobile mode, and having been instructed by said smartphone user to connect to one of said available client web browsers, sending a connection request to said user-selected client web browser;
   said client web browser, when in waiting-client mode, receiving said connection request and establishing a client/server web browser connection with said server web browser and changing to the client mode of operation;
   said server web browser, when in waiting-server mode and having established said client/server web browser connection to said client web browser, changing to the server mode of operation;
   said server web browser, when in mobile mode and having established said client/server web browser connection to said client web browser, closing the web browser window on said smartphone and changing to the server mode of operation;
   said client web browser, when in client mode, requesting a resource necessary for rendering a web page for display by sending a server browser resource request for said resource on said client/server web browser connection to said server web browser;
   said server web browser, when in server mode, receiving said server browser resource request from said client/server web browser connection and acquiring said resource, either directly from said smartphone, or by requesting said resource from an online source, then returning said resource to said client web browser in a server browser resource response on said client/server web browser connection;
   said client web browser, when in client mode, receiving said server browser resource response from said client/server web browser connection and using said resource contained in said server browser resource response to render said web page for display;
   said server web browser, when in waiting-server mode, reacting to said smartphone user opening a web browser window for use on said smartphone by changing to the mobile mode of operation;
   said server web browser, when in server mode, reacting to said smartphone user opening a web browser window for use on said smartphone by closing said client/server web browser connection and changing to the mobile mode of operation;
   said server web browser, when in mobile mode, reacting to a smartphone user action of closing said web browser window on said smartphone by changing to the waiting-server mode of operation;
   said client web browser, when in client mode, reacting to a client web browser user action of closing said client web browser window on said user interface device by closing said client/server web browser connection and changing to the waiting-client mode of operation; and
   said server web browser, when in server mode, reacting to said client/server web browser connection closing by changing to the waiting-server mode of operation.

2. A method of claim 1, wherein browser states, are transferred between said client web browser and said server web browser, the method comprising:
   said client web browser, when changing to client mode, requesting a browser state of said server web browser by sending a browser state request on said client/server web browser connection to said server web browser;
   said server web browser, when in server mode, receiving said browser state request from said client/server web browser connection and sending said browser state of said server web browser in a browser state response on said client/server web browser connection to said client web browser;
   said client web browser, when in client mode, receiving said browser state response from said client/server web browser connection and using said browser state contained in said browser state response to set said initial browser state on said client web browser;
   said client web browser, when in client mode, handling a browser state change on said client web browser that needs to be persisted on said smartphone by sending a browser state change request on said client/server web browser connection to said server web browser; and
   said server web browser, when in server mode, receiving said browser state change request from said client/server web browser connection and persisting said browser state change on said smartphone.

3. A method of claim 1, further comprising a resource switch software component of said distributed web browser software application, wherein:
   said resource switch can receive a local resource request, where said local resource request comes from said distributed web browser software application instance that said resource switch is a software component of;
   said resource switch, when running in client mode, routing said local resource request such that said resource requested by said local resource request is acquired by sending a server resource request on said client/server web browser connection to said server web browser;

said resource switch, when running in mobile, mode or default mode, routing said local resource request such that said resource requested by said local resource request is acquired by the distributed web browser software application instance that said resource switch is a software component of;

said resource switch, when running in waiting-client mode, waiting-server mode or server mode, ignoring said local resource request;

said resource switch can receive a remote resource request, where said remote resource request comes from said client/server web browser connection;

said resource switch, when running in server mode, routing said remote resource request such that said resource requested by said remote resource request is acquired by said smartphone;

said resource switch, when running in waiting-server mode, waiting-client mode, client mode, mobile mode or default mode, ignoring said remote resource request;

said resource switch can receive a local resource response, where said local resource response comes from said distributed web browser software application instance that said resource switch is a software component of;

said resource switch, when running in server mode, routing said local resource response such that said resource contained in said local resource response is sent in said server resource response on said client/server web browser connection to said client web browser;

said resource switch, when running in mobile mode or default mode, routing said local resource response such that said resource contained in said local resource response is used by the distributed web browser software application instance that said resource switch is a software component of;

said resource switch, when running in waiting-server mode, waiting-client mode or client mode, ignoring said local resource response;

said resource switch can receive a remote resource response, where said remote resource response comes from said client/server web browser connection;

said resource switch, when running in client mode, routing said remote resource response such that said resource contained in said remote resource response is used by the distributed web browser software application instance that said resource switch is a software component, of; and said resource switch, when running in waiting-client mode, waiting-server mode, server mode, mobile mode or default mode, ignoring said remote resource response.

4. A method of claim 3, further comprising a data process software component of said distributed web browser software application, wherein:

said data process is responsible for receiving requests from said resource switch and sending said requests on said client/server web browser connection, such as when a client web browser is the sender of a server browser resource request;

said data process is responsible for receiving requests from said client/server web browser connection and sending said requests to said resource switch, such as when a server web browser is the recipient of a server browser resource request;

said data process is responsible for receiving responses from said resource switch and sending said responses on said client/server web browser connection, such as when a server web browser is the sender of a server browser response; and said data process is responsible for receiving responses from said client/server web browser connection and sending said responses to said resource switch, such as when a client web browser is the recipient of a server browser response.

\* \* \* \* \*